United States Patent Office 2,926,846
Patented Mar. 1, 1960

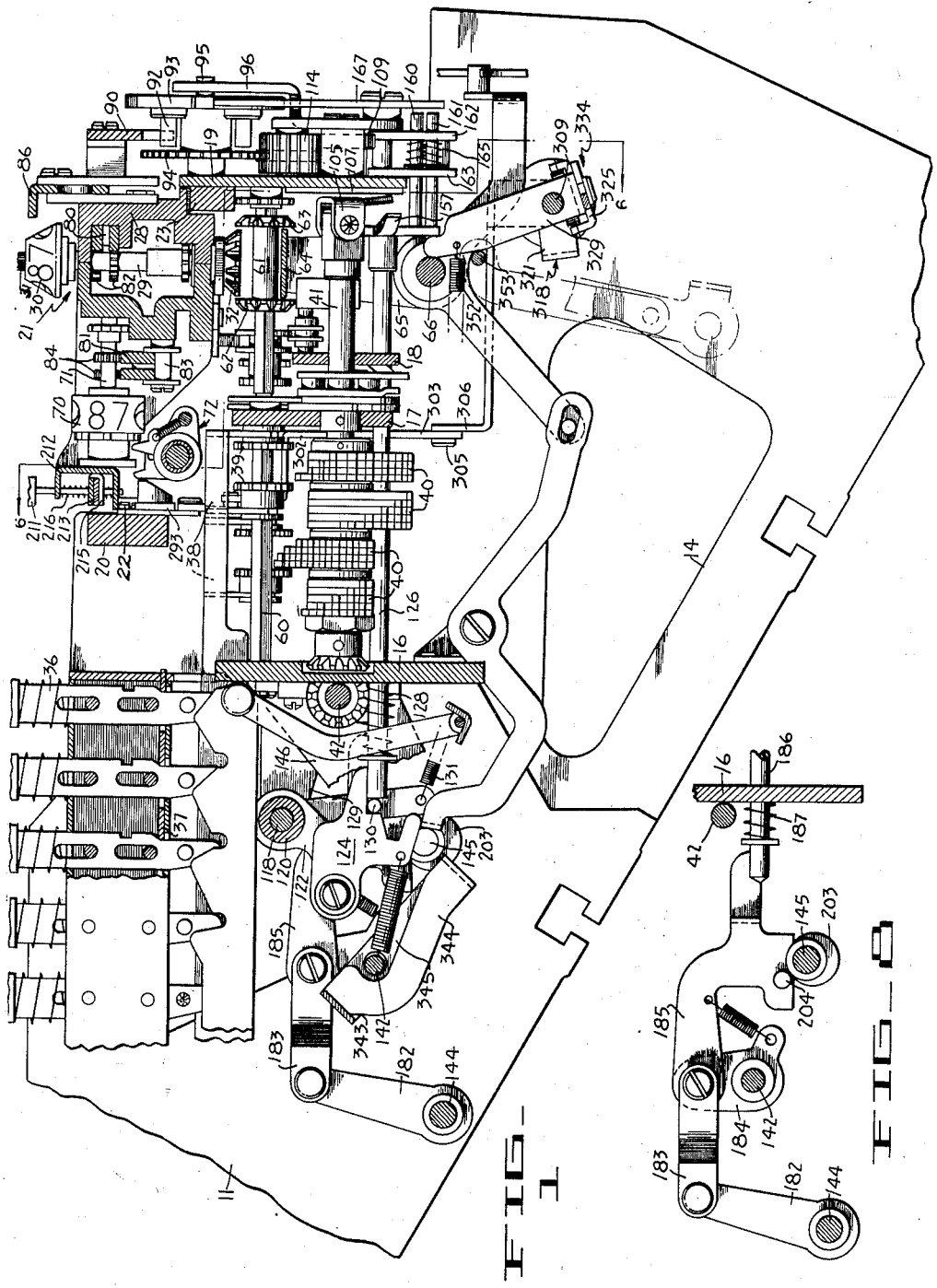

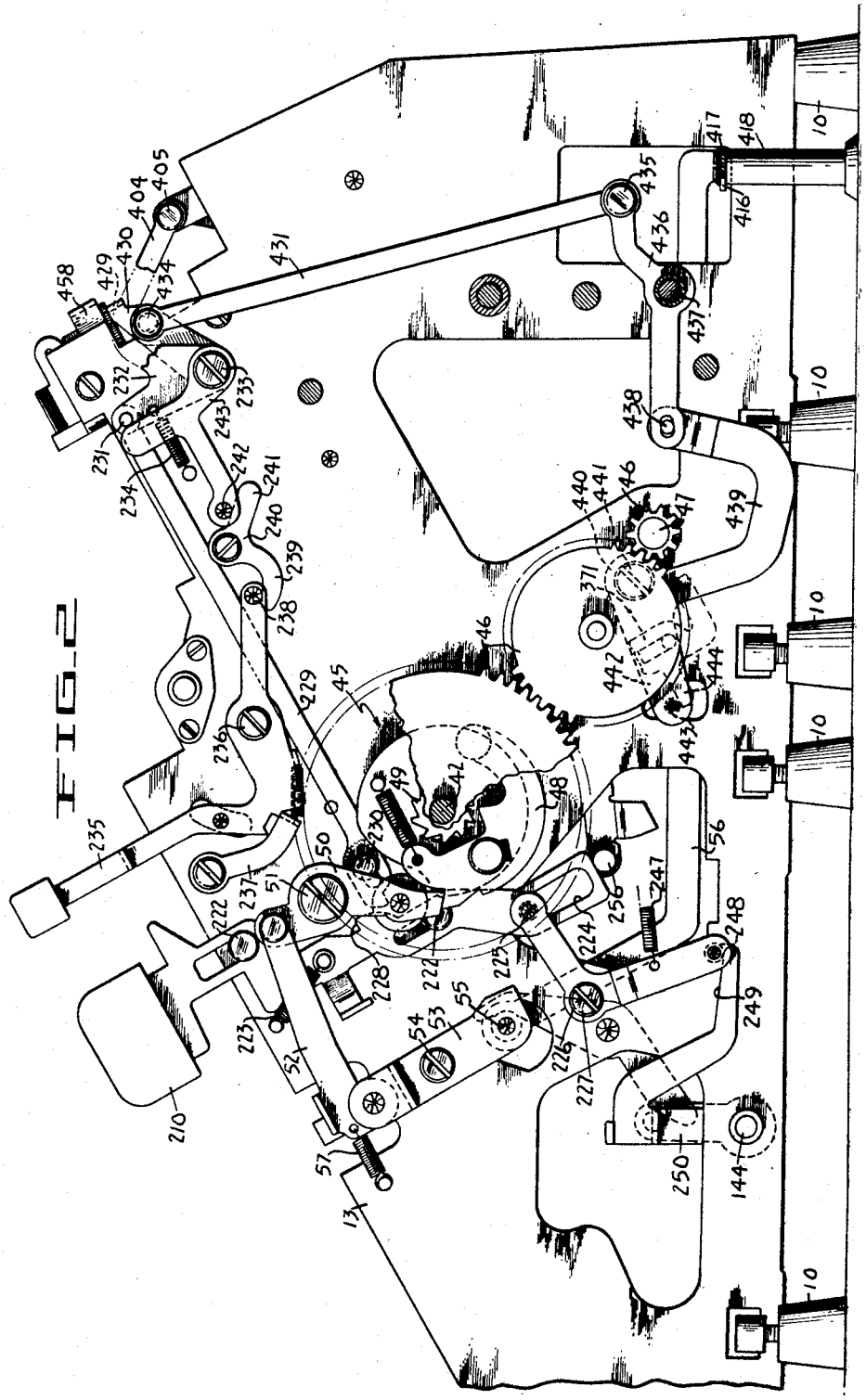

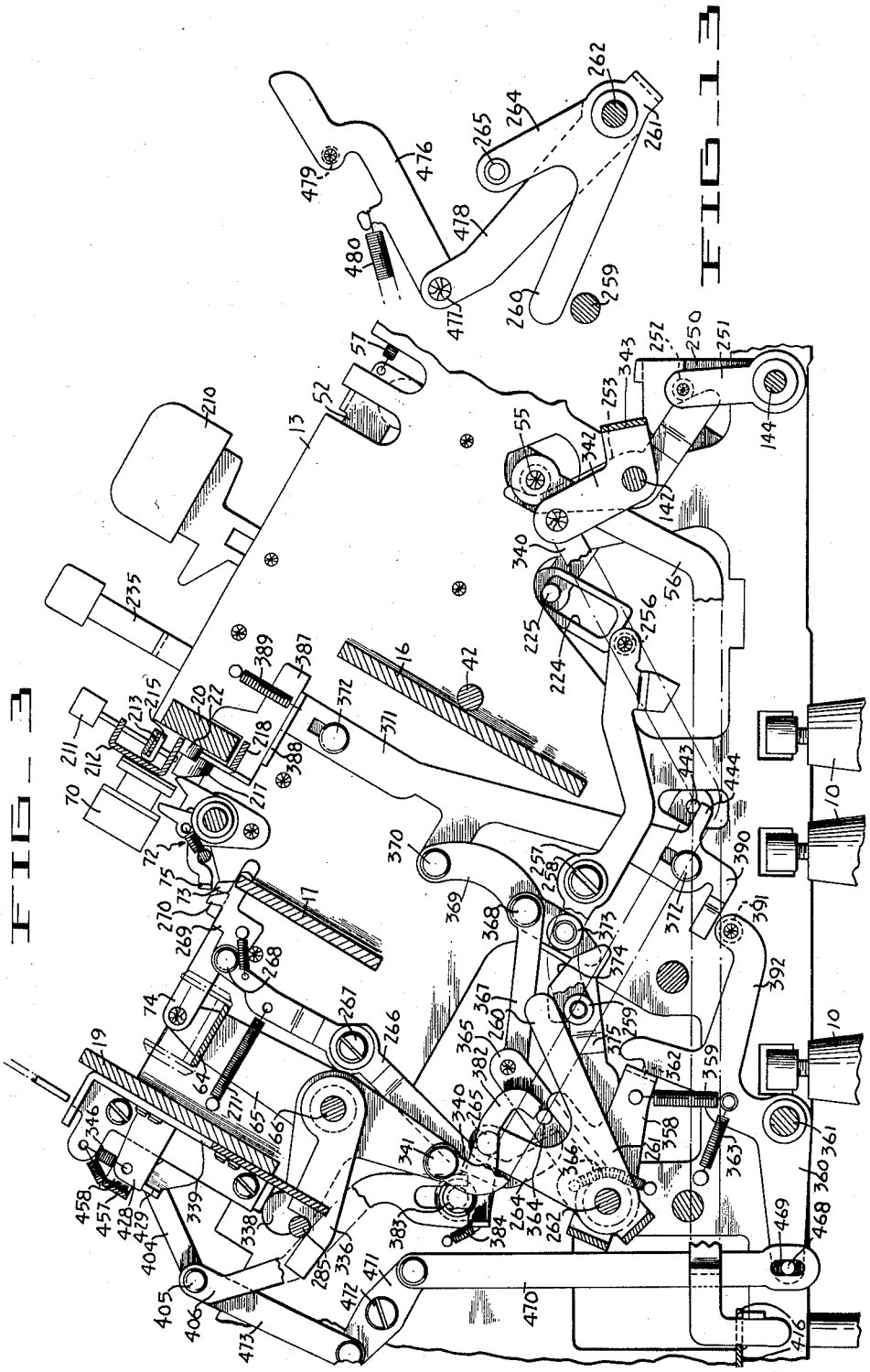

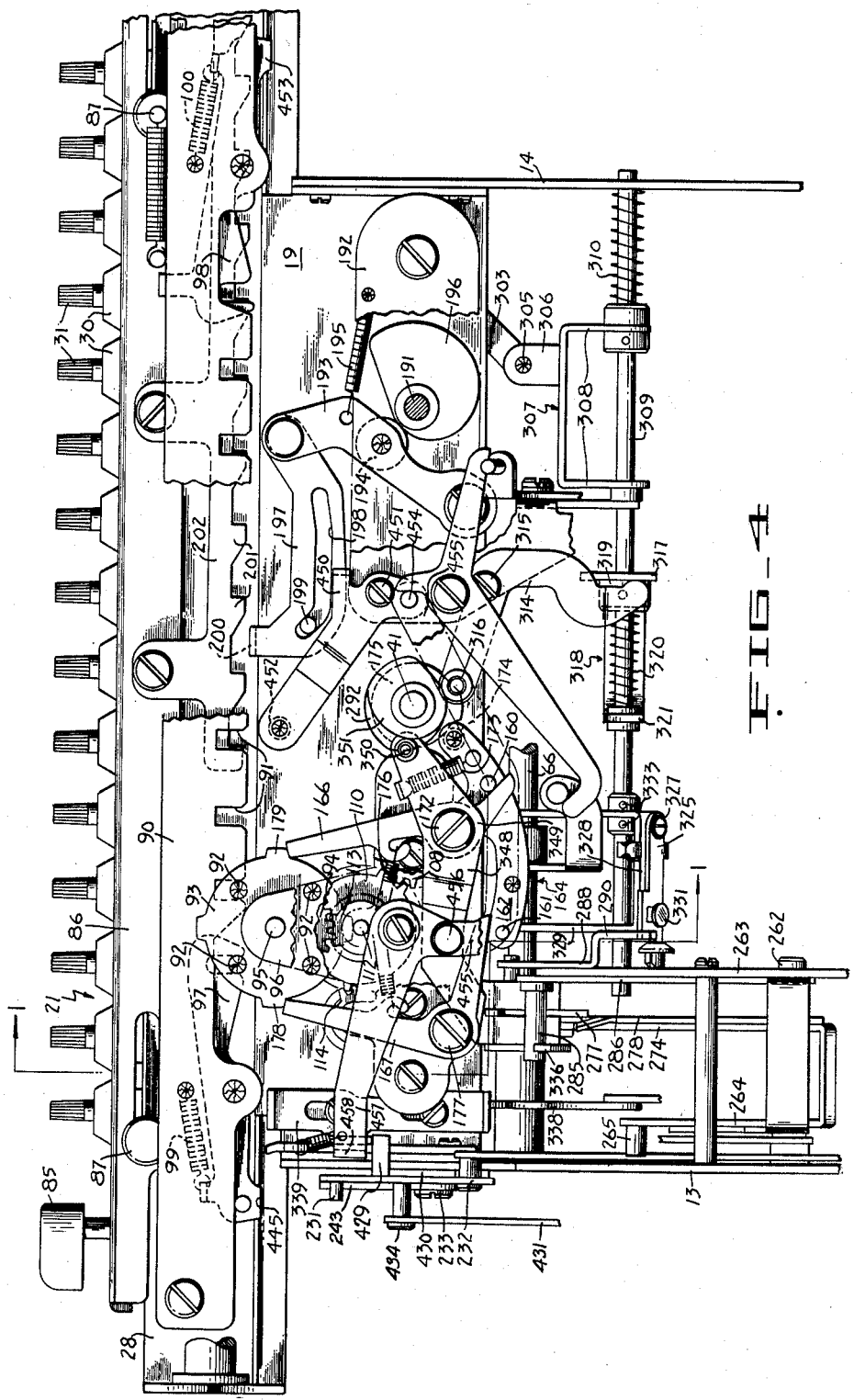

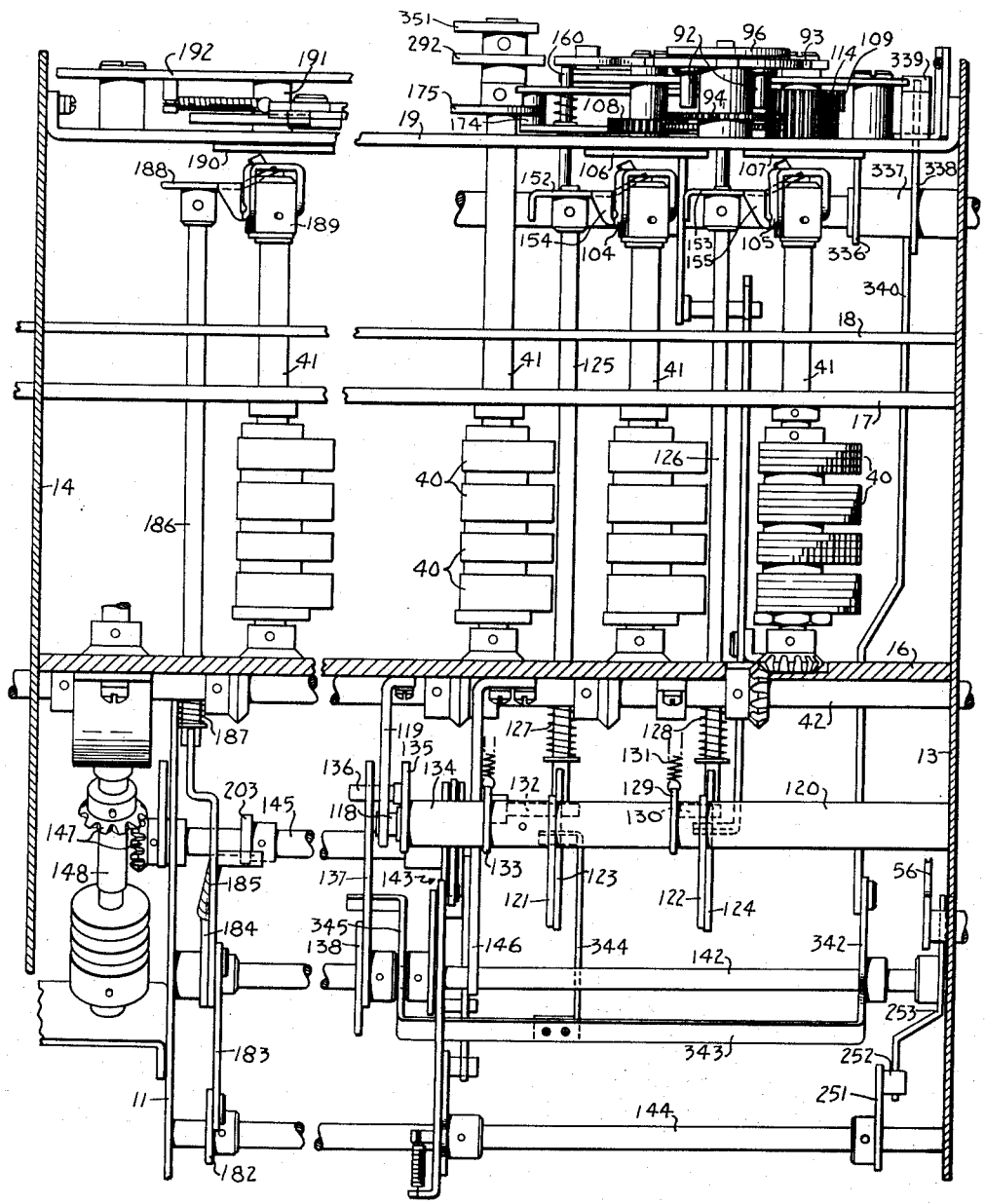
FIG_5

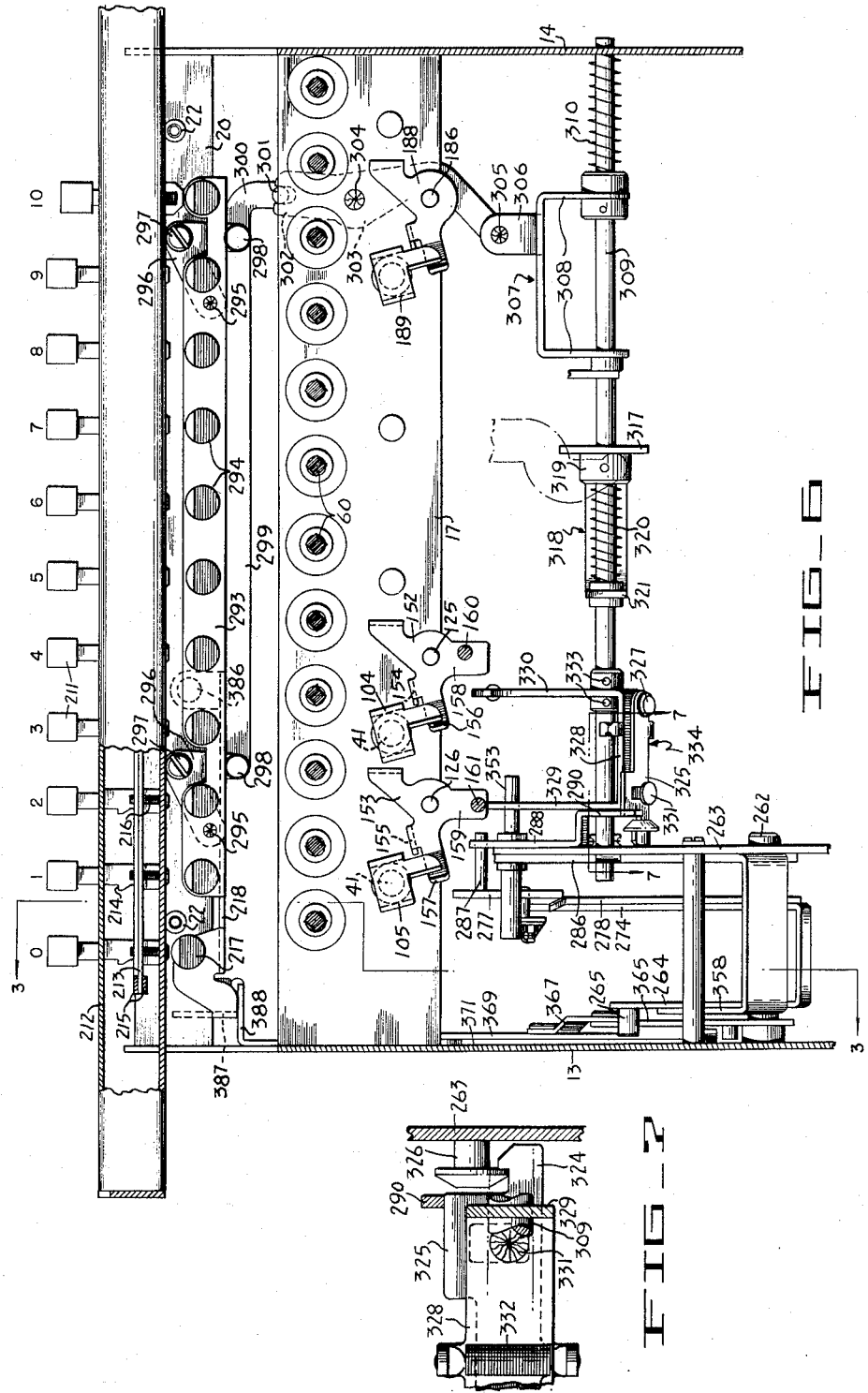

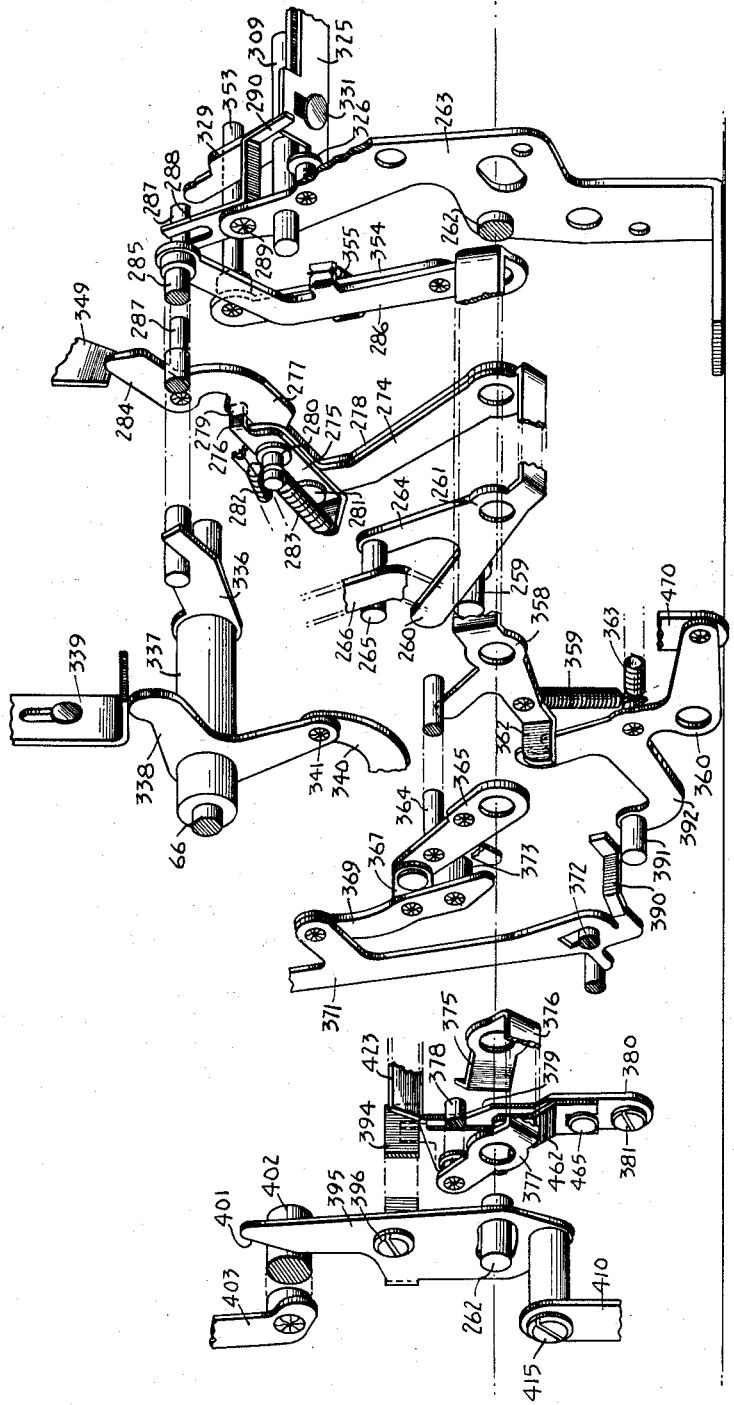

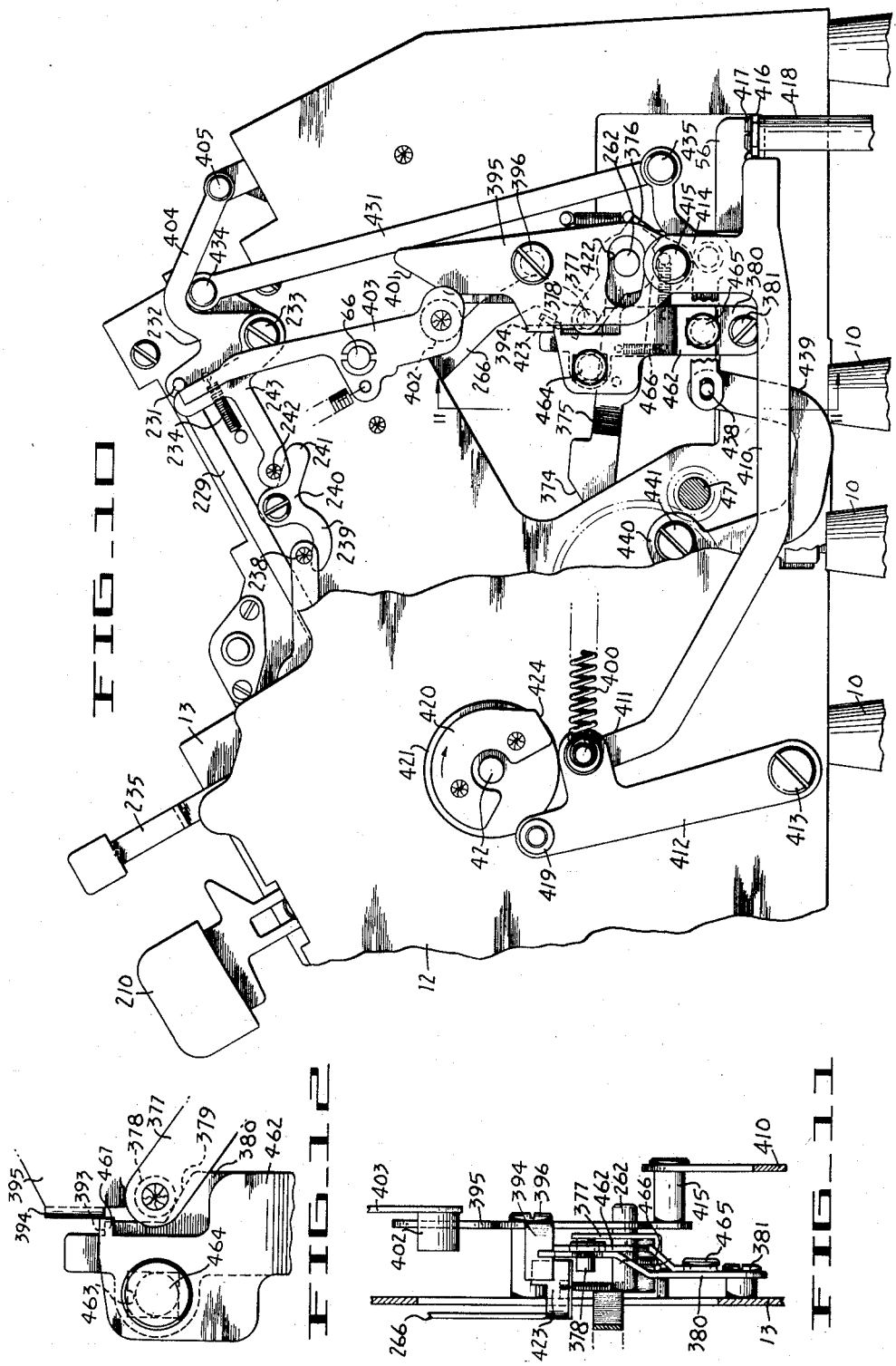

2,926,846

PREDETERMINED CARRIAGE SHIFTING AND DIVIDEND ENTERING MEANS FOR A CALCULATING MACHINE

Arthur J. Malavazos and Jan Urdal, Oakland, Calif., assignors to Friden, Inc., a corporation of California Application July 2, 1956, Serial No. 595,471

7 Claims. (Cl. 235—63)

This invention relates to calculating machines and is concerned more particularly with automatic control means therefor.

An object of the invention is to provide a calculating machine with automatic means for entering a dividend in any one of a plurality of register positions.

Another object of the invention is to provide an improved mechanism in a calculating machine for automatically controlling the tabulation of a register carriage therein.

Another object of the invention is to provide an improved mechanism for controlling the tabulation of the register carriage in a calculating machine in either direction to a selected position.

Another object of the invention is to provide a calculating machine with an improved mechanism for automatically zeroizing the register and thereafter shifting the register to a predetermined ordinal position in the machine.

A further object of the invention is to provide a calculating machine with improved mechanism for automatically shifting the accumulator carriage in either direction to an end position and therein effecting the entry of a dividend.

Other objects and advantages will be apparent from the following description of a preferred embodiment as illustrated in the accompanying drawings, in which:

Fig. 1 is a fragmentary sectional elevation of the interior of the machine, the view being taken on the vertical planes indicated by the lines 1—1 of Fig. 4.

Fig. 2 is a fragmentary elevational view of the right side control frame showing the main driving clutch and controls therefor.

Fig. 3 is a sectional elevational view of the left-hand side of the right side control frame, the view being taken on the vertical planes indicated by the lines 3—3 in Fig. 6.

Fig. 4 is a rear elevational view of the machine.

Fig. 5 is a plan view of the shift control mechanism and the register zeroizing mechanism.

Fig. 6 is a sectional rear elevational view of the shift clutches and the controls therefor, the view being taken on the vertical planes indicated by the lines 6—6 in Fig. 1.

Fig. 7 is an enlarged detail of the shift control latch, the view being on a frontal plane indicated by the line 7—7 in Fig. 6.

Fig. 8 is an elevational view of the control linkage for the zero resetting clutch.

Fig. 9 is a cabinet projection of the dividend entry control mechanism.

Fig. 10 is a fragmentary elevational view of the rear portion of the right side control frame with the outside frame broken away for a clearer illustration.

Fig. 11 is an elevational view from the front of the dividend entry control mechanism, the view being taken on a vertical plane indicated by the line 11—11 in Fig. 10.

Fig. 12 is an enlarged view of the latch release for the dividend entry control mechanism.

Fig. 13 is an illustration of a modification of the retractable shift control means shown in Fig. 9.

The calculating machine selected for illustration in conjunction with the instant invention is of the general type shown and described in Patent No. 2,229,889, issued to Carl M. F. Friden on January 28, 1941, as modified by Patent No. 2,636,678 issued to Morton P. Matthew on April 28, 1953, Patent No. 2,679,916 issued to Morton P. Matthew on June 1, 1954 and the copending application, S.N. 571,289 of Elwood A. Davis filed March 13, 1956. The machine utilizes an actuating mechanism of the unidirectional continuous drive cycle type, wherein all power-driven operations are effected by engagement and disengagement of a single clutch providing the only path of power flow from the motor of the machine to the motor driven parts thereof.

The frame of the machine includes a base (not shown) with bosses 10 (Figs. 2, 3 and 10) which support intermediate frame plate 11, right side frame 13, right side control plate 12 and left frame 14. Side frames 13 and 14 may be connected by transverse brackets 16, 17, 18, 19 and 20 which serve to support various mechanisms of the machine. The register carriage, indicated generally at 21 (Fig. 1), which supports the accumulator and the revolutions counter, rests on rollers 22 on transverse bracket 20 and on bar 23 secured to transverse bracket 19 for endwise shifting movement laterally of the machine in either direction to various ordinal positions, as controlled by means described hereinafter.

Carriage 21 (Fig. 1) includes a frame 28 in which numeral wheel shafts 29 are journalled to carry numeral wheels 30 of conventional construction. Numeral wheels 30 have projecting twirler knobs 31 for manual setting thereof. To transmit increments of value to numeral wheels 30, each shaft 29 extends below the frame 28 and carries a ten-tooth gear 32 which is actuated by means now to be described.

*Drive selecting and actuating mechanisms*

The values to be introduced in the numeral wheels 30 are selected by means of a plurality of orders of settable value keys 36 (Fig. 1) of conventional construction. Keys 36 are slotted for endwise sliding movement and are adapted to be latched in depressed position by a latching bar 37 associated with each order of keys 36 and adapted to be operated to release a depressed key by a 0 key in each order. All of the orders of keys can be released simultaneously in a well-known manner by the operation of a key releasing gate extending along the front edge thereof.

The keys 36 cooperate with selecting mechanism including spring-urged selecting slides 38 mounted for endwise movement to position gears 39 selectively with respect to the stepped teeth of the associated actuating cylinders 40. Cylinders 40 for adjacent orders are mounted on actuator shafts 41 having suitable bevel gear connections with a transverse drive shaft 42 which is suitably journalled in side frames 13 and 14.

Shaft 42 and shafts 41 are driven cyclically from a motor (not shown) through the clutch, indicated generally at 45 (Fig. 2), which may be driven by suitable gearing 46 from the motor shaft 47. Clutch 45 may be engaged or disengaged by oscillation of spring-urged clutch pawl, or dog, 48, mounted for rotation with shaft 42, with respect to ratchet 49 driven by gearing 46 rotatable on shaft 42. Clutch control lever 50 is pivoted at 51 on side frame 13 to determine the engagement or disengagement of the clutch by effecting the engagement of the tooth of pawl 48 with, or releasing it from, engagement with ratchet 49 in the full-cycle position of shaft 42. The rocking movement of lever 50 is controlled by link 52 pivotally connected at its one end to lever 50 and its other end to one end of lever 53 pivoted at 54 on side frame 13. At its lower end, lever 53 carries pin 55 extending through an aperture in side frame 13 to provide a pivotal connection with link 56 extending rearwardly of the machine to control the closing of the motor switch in a conventional manner, see also Fig. 3. Clutch control lever 50 is normally urged to its clutch-disengaging position by spring 57 supported by a pin on side frame member 13 and by a hole in one end of link 52.

The number of increments of rotation transmitted to a gear 39 (Fig. 1) by a cylinder 40 during cyclic operation of the clutch is transmitted to the square shaft 60 which carries each ordinal pair of gears 39 and extends rearwardly of the machine in the usual manner. Each square shaft 60 carries a spool 61 having bevel gears 62, 63 for cooperation with the corresponding ordinal numeral wheel gear 32. The engagement of gears 62 or 63 with gears 32 is controlled by a strap, or gate, 64 positioned between the gears 62 and 63 and mounted at its ends by similar arms 65 for rocking movement with shaft 66. Hence, rocking of shaft 66 clockwise or counter-clockwise determines additive or subtractive transmission of increments to the numeral wheels 30. A conventional means is provided to normally maintain gate 64 and plus-minus gears 62, 63 in their centralized position with respect to dial shaft gears 32. Any suitable control means, such as a plus key and a minus key, may be provided for rocking the shaft 66 to cause positive and negative registration in the dials 30 or the shaft 66 may be rocked by automatic means, such as will be described hereinafter.

*Revolutions counter mechanism*

The revolutions counter may comprise numeral wheels 70 (Fig. 1) on shafts 71 actuated by means of a conventional actuator, indicated generally at 72, which is rocked from drive shaft 42 through a spring connection, in a clockwise direction from the position shown in Fig. 1, into operative engagement with the aligned numeral wheel 70 and then is translated axially to effect entry of the digit. Operation of the revolutions counter actuator is prevented during shifting operations of the machine by the positioning of a tooth 73 (Fig. 3) carried by slide 74 beneath tooth 75 formed at right angles to the end of an extended arm of counter actuator 72. Slide 74 is pivotally connected to a bracket on plus-minus gate 64, so that with the clockwise or counter-clockwise rocking movement of shaft 66 and therefore gate 64 (Fig. 3) the tooth 73 is moved from beneath ear 75 of counter actuator 72, thereby enabling a count to be made. A slot is provided in the transverse bracket 17 to guide slide 74 in its reciprocation.

*Register resetting means*

Means are provided on the carriage for resetting the accumulator numeral wheels 30 and revolutions counter numeral wheels 70 to 0 registration, including means such as respective rack bars 80 and 81. Rack bars 80 are mounted for endwise sliding movement in the carriage frame adjacent the upper end of a numeral wheel shaft 29 for cooperation with mutilated gears 82 carried by numeral wheel shafts 29, while rack bars 81 are mounted for endwise sliding movement on rollers 83 secured on carriage frame 28 for cooperation with mutilated gears 84 carried by counter wheel shafts 71. Adjacent gears of each set of gears 82, 84 are offset to cooperate with the adjacent respective vertically and horizontally offset racks formed on rack bars 80 and 81 in the usual manner. When rack bar 80 is moved from its position to which it is normally spring-urged, it will engage gear 82 of a numeral wheel 30 displaced from the "0" position and reset the numeral wheel to such position. Likewise, lateral movement of rack bars 81 will engage a mutilated gear 84 of any counter dial 70 which has been displaced from "0" position and reset the dial 70 to such position. Each rack bar 80 and 81 is provided with one of similar knobs 85 (Fig. 4) for manual operation and may be connected to an actuating slide 86 for power operation. Actuating slide 86 is suitably mounted by pin-and-slot connections 87 for reciprocatory movement on the carriage frame 28 and may be selectively connected with either or both rack bars 80 and 81 by means fully disclosed in Patent No. 2,294,083 issued to Carl M. Friden, August 25, 1942.

*Carriage shift mechanism*

The carriage may be shifted in either direction from one ordinal position to another by power-driven mechanism of conventional construction controlled by manually operable keys (not shown). Carriage 21 is provided with a rack 90 (Figs. 1 and 4) suitably mounted along the rear edge thereof, which rack has a plurality of vertical slots 91 having a width slightly greater than the diameter of the coacting shift pins 92. Slots 91 are formed in the lower edge of rack 90 and are spaced-apart a distance equal to the ordinal spacing of the numeral wheels 30 and the keyboard orders. These slots 91 are adapted for engagement by a coacting pair of the four shift pins 92 which are symmetrically disposed in quadrature arrangement on the carriage shift drive disk, or pin wheel, 93 secured on a hub which also carries a gear 94 and is journalled on a fixed shaft 95 mounted on transverse bracket 19 and is supported at its free end by a bearing plate 96 also secured on transverse bracket 19. Thus, a one-fourth, or 90°, rotation of the drive disk, or pin wheel, 93 moves rack 90 laterally so as to effect one ordinal step of movement of the shiftable carriage 21. At its ends the shift rack 90 is provided with a pair of oppositely disposed yieldable pawls 97 and 98 which are adapted to be rocked by the shift pins 92 against the urgency of their associated springs 99 and 100, respectively, so as to prevent the attempted shifting of the register carriage beyond the lowest and highest ordinal positions thereof.

The rotation of the carriage shift disk 93 in either direction is selectively controlled by drive connections from the actuating means of the machine. The two lowest order actuator shafts 41 are extended rearwardly, having respective left and right shift clutch drivers 104 and 105 (Figs. 1 and 5) pivotally connected to the ends thereof, in a manner such as to form a readily controllable clutching and declutching engagement with the associated clutch follower assemblies 106 and 107 secured to the respective gears 108 and 109 journalled on shafts supported between transverse frame member 19 and bearing plate 96. Gear 108 meshes with driven gear 110 (Fig. 4) of a unitary compound gear assembly, which also includes a smaller concentric gear 113 enmeshed with clutch disk gear 94. The gear unit 110, 113 is journalled on shaft 112 supported between transverse frame member 19 and bearing plate support 96. Gear 109 is axially offset from gear 108, meshing with a relatively wide reverse idler gear 114 suitably journalled on the frame and enmeshed with the gear 110. Thus, rotation of the gears 108 and 109 in a clockwise direction, as viewed in Fig. 4, causes shifting of the carriage 21 to the right or to the left, respectively, as viewed from the rear of the machine.

Right and left shift keys (not considered pertinent to the invention and therefore not shown) are depressible to initiate shifting of the carriage to the right and left, respectively, as viewed from the front of the machine. Depression of either shift key serves to enable the associated drive conection as well as to engage the clutch and energize the motor. The depression of the left shift key rocks shaft 118 (Fig. 5) in a well-known manner to enable the drive conection from an actuating shaft 41 to the carriage left shifting mechanism, while the depression of the right shift key operates to rock sleeve 120 rotatable on shaft 118 to enable the drive connection from an actuator shaft 41 to the carriage right shift control mechanism. Shaft 118 is journalled in bracket 119 secured to transverse frame member 16 and in side frame member 13. Intermediate its ends, shaft 118 carries a depending arm 121 similar to the depending arm 122 (Fig. 1) secured on sleeve 120.

Pusher arms 123 and 124 are pivotally connected to respective arms 121 and 122 for controlling the rearward movement of the respective left shift push rod 125 or right shift push rod 126, each of which is normally urged to the inoperative position thereof by respective springs 127 and 128. Depending arm 129, rockably mounted on shaft 118, carries pin 130 which is urged by spring 131 into engagement with the end of right shift push rod 126 and is disposed between the end of the rod and the shoulder on pusher arm 124 for control thereby. Similarly, pin 132 caried by the lower end of depending arm 133, is disposed between a similar shoulder on pusher arm 123 and the end of left shift push rod 125. Arm 133 is secured to one end of sleeve 134 rockable on shaft 118 while arm 135 is secured to the other end thereof and is provided with a pin 136 normally engaged by the notched end of pusher arm 137. Pusher arm 137 is pivotally connected to the upper end of upwardly extended arm 138 secured on transverse shaft 142 for control in a well-known manner by the eccentrically operated mechanism indicated generally at 143, the operation of which is initiated by the clockwise rocking of shaft 144, as viewed from the right in Fig. 5.

The eccentrically operated mechanism 143 is cyclically driven by shaft 145 journalled in intermediate frame plate member 11 and bracket 146 secured on transverse frame member 16. At its left end (Fig. 5) shaft 145 has a bevel gear connection 147 with a vertically extended shaft 148 having a similar bevel gear connection with transverse drive shaft 42. The operation of the eccentrically operated mechanism and its control of the left carriage shift mechanism during plural order operations such as multiplication is not considered pertinent to the invention; however, for a complete disclosure of this mechanism, reference is to be had to the patent to Anthony B. Machado, No. 2,650,761, issued September 1, 1953.

At their rearward ends, each of the rods 125 and 126 carries a respective controller 152, 153 adapted to coact with the associated shift clutch driver 104 and 105, respectively, so that, upon depression of either shift key, the associated drive connection is established in the manner described in the aforementioned Patent No. 2,679,916, issued to Morton P. Matthew, June 1, 1954. Thus, by the selective rearward movement of controller 152 or 153, carriage shift drive disk 93 can be rotated in either direction to effect ordinal shifting of the carriage to the left or to the right.

Positive arresting and centralizing mechanism is provided for preventing overthrow of the carriage and for locking the same in the selected ordinal position after the desired shifting movement has been terminated by suitable means, such as the release of the pusher rod 125 or 126 to the influence of the respective spring 127 or 128 (Fig. 5). Each controller 152, 153 (Figs. 1, 5 and 6) at the rearward end of respective push rods 125, 126 is provided with forwardly extending clutch-disengaging dogs 154, 155, angularly outwardly extending clutch-engaging ears 156, 157, and downwardly disposed extensions 158, 159, respectively. The extension 158 on the controller 152 mounted on left shift push rod 125 lies directly in front of a left shift control pin 160, while the extension 159 on the controller 153 mounted on right shift push rod 126 lies directly in front of right shift control pin 161. The shift control pins 160, 161 are slidably mounted in, and project longitudinally beyond, suitable holes formed in the spaced shift unlocking plates 162 and 163 (Figs. 1 and 4) which are rigidly secured together to form an integral lever, or rocker, 164. As shown in Fig. 1, each of the pins 160, 161 is provided with a centrally disposed annular stop ring which is urged forwardly against plate 163 to its normally inactive position by a coaxial compression spring 165, the other end of which bears against the inner surface of plate 162. The springs 165 serve to restore the control pins 160, 161, so that the outer ends thereof are normally disposed out of cooperative relation with the shift centralizing levers 166 and 167 and thereby aid the shift rod return springs 127 and 128. Rocker 164, which carries the shift control pins 160 and 161, is pivotally supported on pin 172 secured on transverse frame member 19. The rocker 164 is urged in a counter-clockwise direction (Fig. 4) by spring 173 to maintain roller 174, supported between plates 162 and 163, in engagement with control cam 175 (Figs. 4 and 5) secured adjacent the end of an extension of the third order actuator shaft 41. A suitable interlock lever is provided to prevent the right and left shift clutch mechanisms from being engaged at the same time. Such interlock means is fully disclosed in the aforementioned Patent No. 2,636,678.

Referring now to Fig. 4, locking lever 166 is pivotally mounted on pin 172 and is connected by the spring 176 to the oppositely disposed shift locking lever 167 pivotally mounted at 177 on bearing plate member 96. The lever 167 is provided with a substantially square cut end which is adapted to be urged by spring 176 into positive engagement with the left-hand ear 178 on the carriage shift drive disk 93 whenever the pin 161 is in its inactive position forward of the plane of the coacting arm of lever 167. Similarly, the shift locking lever 166 is provided with a square end which is adapted to be urged by spring 176 into positive engagement with the right-hand ear 179 on the shift drive disk 93 whenever the control pin 160 is in its inactive position forward of the plane of the coacting angularly disposed arm of lever 166.

It is readily apparent that upon initiation of a left carriage shift operation, the rearward movement of the controller 152 moves pin 160 rearwardly, to the right, as viewed in Fig. 1, for cooperation with shift locking lever 166. As the shift cycle begins cam 175 (Fig. 4) rocks rocker 164 clockwise and locking lever 166 clockwise to release the lever 166 from locking engagement with the right-hand ear 179 on the associated shift drive disk 93. As the left shift operation progresses, the drive disk 93 rotates clockwise through an angle of 90° and the lower ear thereon moves to the horizontal position, momentarily camming the locking lever 167 counter-clockwise against the tension of spring 176. As the disk reaches its 90° position, the lever 167 snaps beneath the ear to form a detent against rebound of the shift disk 93. During the course of a single shift cycle or prior to the termination of the last shift cycle in a multiple shift operation, shift rod 125 and its controller 152 is released to the inactive position shown in Fig. 5. Pin 160 is therefore restored to its inactive position out of cooperative positioning with respect to locking lever 166, thereby enabling lever 166, under the urgency of spring 176, to be moved into active position for positive engagement with the right-hand ear on drive disk 93 as it comes into the full-cycle position.

A right carriage shift is controlled in a similar manner when the rearward movement of the pusher rod 126 and its controller 153 moves pin 161 to the rear into cooperative relation with the horizontal arm of locking lever 167. Thus, the initial clockwise rocking movement of rocker 164 by cam 175 rocks lever 167 counter-clockwise to disengage the end of lever 167 from the associated ear 178 on drive disk 93. During the right shift operation, locking lever 166 remains in active position to serve as a detent for the drive disk 93, preventing rebound in as the full-cycle position of the disk during the operation.

*Power-operated resetting mechanism*

Upon clockwise rocking movement of shaft 144, as viewed from the right in Fig. 5, to condition the eccentrically controlled mechanism 143 for operation, a resetting clutch is engaged and is effective in the first machine cycle to zeroize either or both registers. To initiate the resetting operation, shaft 144 carries upstanding arm 182 pivotally connected to one end of link 183 (Figs. 1, 5 and 8), the other end of which is pivotally connected to arm 184 rockable on shaft 142. The pivot for link 183 on arm 184 also serves as a pivot for one end of pusher arm 185, the notched offset end of which is normally spring-urged into engagement with the end of resetting pusher rod 186. Hence, upon rocking movement of shaft 144, pusher rod 186 is moved rearwardly against the urgency of spring 187, which normally maintains rod 186 in the normally inactive position shown. The construction of the resetting clutch is identical to that of the right and left shift clutches described above. The clutch controller 188 is secured to the rearward end of the pusher rod 186, and, upon movement thereof rearwardly, causes the engagement of the clutch driver 189 with the clutch follower 190 secured on the stub shaft 191 journalled in transverse bracket 19 and auxiliary plate 192. The release of any one of the push rods 125, 126 or 186 during any part of a machine cycle will effect a disengagement of the associated clutch in the full-cycle position thereof.

To control the reciprocation of the actuating slide 86 (Fig. 4), actuating lever 193 is pivoted at its lower end on transverse frame member 19, and intermediate its ends carries roller 194 urged by spring 195 to follow cam 196 secured on stub shaft 191. At its upper end, lever 193 is pivotally connected to lever 197 mounted for reciprocation on transverse frame member 19 by the engagement of an irregularly shaped slot 198 therein with pin 199 on member 19. The contour of the slot 198 and the shape of the cam 196 is such that immediately upon clockwise rotation of the cam, when viewed from the rear as in Fig. 4, lever 197 is moved to the left and ear 200 formed at right angles to the free end thereof is moved upwardly to engage a corresponding tooth 201 of rack 202 secured on actuating slide 86. A tooth 201 is provided in the rack 202 for each ordinal position of the register carriage 21, the teeth being spaced-apart a distance equal to the ordinal spacing in the machine. Further reciprocatory movement of the lever 197, following the engagement of the ear 200 with an associated tooth 201 moves actuating slide 86 to the left, as viewed in Fig. 4, to zeroize either the accumulator or revolutions counter, or both. Near the end of the cyclic rotation of cam 196, roller 194 drops off abruptly under the influence of spring 195 to restore the lever 197 to the inactive position shown.

Thus, it can be seen, that upon rocking of shaft 144 (Figs. 5 and 8), a register resetting operation takes place immediately, irrespective of the position of the register carriage. The resetting operation is limited to the first machine cycle and the disengagement of the resetting clutch is assured at the end of this cycle by the rotation of cam 203 secured on cyclically operable shaft 145. As shaft 144 is rocked clockwise (Fig. 8) to initiate the resetting operation, pin 204 on a depending portion of pusher arm 185 is moved rearwardly for cooperation with cam 203. After 180° rotation of shaft 145, cam 203, through pin 204, raises the notched end of pusher arm 185 out of engagement with pusher rod 186, releasing the rod to the influence of its spring 187. Controller 188 is therefore positioned to effect disengagement of the clutch elements 189, 190 in the full-cycle position of the parts.

*Tabulation and dividend entry*

The tabulating and dividend entering mechanism of the instant invention operates to zeroize the registers as a preliminary to a division operation and to effect entry of the dividend into the accumulator in any selected ordinal position which may be preset, in accordance with the problem being solved, while suppressing the usual count made in the revolutions counter during entry of a number in the accumulator. After setting of the dividend into the keyboard, the only other operation necessary is the depression of the dividend entry key 210 (Figs. 2 and 3), after which the machine automatically operates to perform the above-described functions. The entry of the dividend is thereafter effected in the desired ordinal position of the carriage, which is preset in accordance with the number of quotient figures desired or in accordance with the desired position of the decimal point in the quotient. Depression of the dividend entry key 210 effects a closure of the motor switch and engagement of the resetting clutch and substantially simultaneously engages the main clutch and conditions mechanism for disabling the left shift control and for effecting the engagement of the predetermined shift clutch during the resetting cycle.

Conventional means are provided in the form of tabulator keys 211 (Figs. 1, 3 and 6) for predetermining the order in the register to which the carriage is to be shifted, i.e., the order in the register that is to be aligned with the units order in the keyboard. Each of the keys 211 corresponds to an ordinal position of the carriage. The orders of the register and the corresponding tabulator keys to the left of the units order in the keyboard, as viewed from the front of the machine, may be considered to be the inboard orders thereof, whereas the orders and corresponding tabulator keys to the right of the keyboard units order may be considered to constitute the outboard orders of the register. When the carriage is in its leftmost position, as viewed from the front of the machine and as seen in Fig. 6, the first order dial in the register is aligned with the units order of the keyboard, whereas if the carriage is shifted to its rightmost position, the eleventh order dial in the register is aligned with the keyboard units order and the "10" tabulator key assumes the position of the "0" key in Fig. 6. The tabulator keys 211 are numbered from "0" to "10" to indicate the number of decimal places in a quotient or other value registered in the carriage.

As seen in Figs. 1, 3 and 6, tabulator keys 211 are mounted for vertical endwise movement in rectangular slots in the front carriage frame channel 212 and may be latched in depressed position by spring-urged latching slide 213 which is adapted to engage over the tooth 214 of a depressed key. The depression of any one key will release a previously depressed key. Latching slide 213 is maintained in position in the frame bar 212 by transverse bracket 215 secured on the bar 212. Keys 211 are normally spring-urged to their raised position by respective springs 216 associated therewith. A depressed key 211 serves to predetermine the direction of shifting movement of the carriage 21 in accordance with the position of the depressed key relative to pin 217 on dividend entry control lever 218, as will be hereinafter described.

Referring to Figs. 2 and 3, dividend entry key 210 is mounted for endwise sliding movement on side frame 13 by means of pins 222 engaging in slots therein. Key 210 is normally urged to the raised position shown in Fig. 2 by spring 223. The lower end of key 210 is provided with elongated slot 224 which is engaged by pin 225 carried at the end of one arm of bellcrank 226 pivotally mounted at 227 on side frame member 13. Intermediate its ends key 210 is provided with latching tooth 228 for engagement by the latching end of a latch slide 229 mounted for endwise movement on side frame 13 by pin-and-slot connection 230 at its forward end, and with its rearward end pivotally supported by pin 231 on the upstanding arm of a lever 232 pivotally mounted at 233 on side frame member 13. Spring 234, associated with lever 232, normally urges slide 229 to latching position. Thus, upon depression of key 210, it is latched in depressed position and remains there until the end of the operation, when unlatching occurs by automatic means to be described later, or the key may be released to terminate the operation by the manual rocking of lever 235 pivotally mounted at 236 on side frame 13.

Spring-urged detent arm 237 normally maintains lever 235 in the inoperative position shown in Fig. 2 and, upon clockwise rocking movement of lever 235, serves to immediately restore the lever to its inoperative position upon the release thereof. The rearwardly extended arm of lever 235 carries pin 238 engaging the arcuate arm 239 of lever 240 pivotally supported on side frame member 13 and having its angularly downwardly extended arm 241 underlying pin 242 on the forwardly extended arm of lever 243, also pivoted at 233 on side frame member 13. The upstanding arm of lever 243 is in engagement with pin 231 pivotally supporting the rearward end of latch slide 229 so that, upon clockwise rocking movement of lever 235, lever 243 is rocked clockwise to remove the nose of latch 229 from engagement with the shoulder 228 on dividend entry key 210, permitting the restoration thereof to its raised position.

Depression of key 210 serves to enable the engagement of the resetting clutch 189, 190 and to close the motor circuit and engage the main drive clutch 45. Spring 247 (Fig. 2) normally urges bellcrank 226 counter-clockwise to maintain pin 225 in engagement with the upper end of slot 224 in key 210. At its lower end, the depending arm of bellcrank 226 carries pin 248 in engagement with the inclined edge 249 of the laterally offset extension of arm 250 secured on the right end of shaft 144 (Figs. 2, 3 and 5). Arm 251, secured on shaft 144 adjacent the right end thereof, carries roller 252 engaging the cam edge of the downwardly extended arm of lever 253 which is pivotally mounted on shaft 142 and has the angularly disposed upper end thereof in engagement with a spacer on pin 55. Thus, upon depression of key 210, shaft 144 is rocked, clockwise as viewed in Fig. 2 or counter-clockwise as viewed in Fig. 3, to rock lever 253, clockwise in Fig. 3, thereby moving link 56 to the right to close the micro-switch and rocking lever 53 and therefore clutch control lever 50 to effect engagement of the clutch 45. Substantially simultaneously with the engagement of the clutch and the closing of the motor switch, the clockwise rocking of shaft 144 (Figs. 1 and 8) moves pusher arm 185 and push rod 186 to the right to effect the engagement of the register resetting clutch 189, thereby zeroizing either or both registers in the first machine cycle, as disclosed in the aforementioned application, S.N. 571,289.

As previously stated, depression of the dividend key 210 also serves to block out the counter actuator to prevent the operation thereof, to condition mechanism for disabling the conventional shift control means, and to enable the operation of the left or right auxiliary shift control mechanism. At its lower extremity, key 210 is in engagement with roller 256 on the forward end of lever 257 (Fig. 3) pivoted at 258 on side frame 13. Lever 257 carries roller 259 at its rearward end, which roller is operably disposed beneath the forwardly extending arm 260 of bellcrank 261 pivoted on shaft 262 which is supported at its ends in side frame 13 and an auxiliary frame member 263 (Fig. 4). The rocking movement of bellcrank 261 is utilized to block the counter actuator against operation. In order to block the operation of the counter actuator by movement of the bellcrank 261 (Figs. 3 and 9), the upright arm 264 of the bellcrank 261 carries pin 265 operatively engaged with the lower end of lever 266 pivoted at 267 on side frame 13. The upper end of lever 266 is pivotally connected at 268 with blocking slide 269 having projection 270 normally urged by spring 271 to the position shown where it is out of the path of oscillation of the ear 75 on the extended arm of counter actuator 72. Spring 271 also serves to maintain roller 256 in engagement with the lower end of the key 210. Counter-clockwise rocking movement of bellcrank 261 operates through lever 266 to move the projection 270 on slide 269 from the position shown in Fig. 3 to a position underlying the tooth 75 of the counter actuator arm, thereby preventing operation of the counter actuator as previously described in connection with the slide 74 associated with the plus-minus gate 64.

In order to condition mechanism to disable the well-known shift control mechanism and to enable the auxiliary shift control mechanism, an arm 274 (Figs. 4, 6 and 9) is formed integrally with bellcrank 261 and at its upper end carries a slide 275 having an ear 276 extending laterally at right angles to the right end thereof. An arm 277 extends rearwardly from its pivotal connection on the upper end of an arm 278 rockably mounted on shaft 262 in juxtaposition with arm 274. Lever 277 is provided with a tooth 279, one edge of which is at 90° to the upper edge of the lever for engagement by ear 276 and the other edge of which is inclined for reasons to be described later. Slide 275 is mounted for reciprocatory movement on the upper end of arm 274 by a spring stud 280 and pin 281 engaging in respective slots in the slide. A relatively strong spring 282, secured at its one end in the framework of the machine and at its other end to an ear on lever 277, normally urges arm 278 counter-clockwise to a position where the forward edge of a nose 284 of the lever 277 rests against the transverse shaft 66. A relatively light spring 283 normally maintains slide 275 in its rearward position (to the right in Fig. 9), which is not sufficiently far to the rear to engage the ear 276 with the tooth 279. The upwardly rearwardly extended free end, or nose, 284 of lever 277 is therefore normally withdrawn from its operative position overlying a pin 285 on the angularly rearwardly disposed end of an arm 286 rockable on shaft 262. A pin 287 extends laterally from the nose 284 of lever 277 and is engaged in a bifurcation in the upper end of a lever 288 pivotally mounted at 289 on auxiliary frame member 263. The depression of the dividend entry key 210 moves the nose 284 of lever 277 rearwardly, to the right in Fig. 9, to its operative position overlying the pin 285 on arm 286, whereupon pin 287 on lever 277 rocks lever 288 and the lower offset end 290 thereof clockwise to enable the positioning of the shift control mechanism in accordance with the position of a depressed tabulator key 211 relative to the pin 217 (Fig. 6), as will be described.

Means are provided under the control of a cam 292 on the extended end of an actuator shaft 41 (Fig. 4), to determine in approximately 60° of the first machine cycle, i.e., the resetting cycle, whether or not an inboard tabulator key 211 is depressed. A bar 293 (Figs. 1 and 6) carries ten pins 294 ordinally spaced in accordance with the spacing of the tabulator keys 211. In the leftmost position of the carriage, to the right as viewed in Fig. 6, it can be seen that there is one pin 294 for each of the ten right-hand tabulator keys 211 while the "0" key is in position to initiate a dividend entry operation were it depressed, as will be described hereinafter. Bar 293 is pivotally connected, adjacent its ends, at 295 on one arm of each of similar bellcranks 296 pivoted at 297 on transverse frame member 20. The other arm of each of bellcranks 296 is pivotally connected at 298 to a horizontally disposed link 299, the center-to-center distance between the pivotal connections 298 being equivalent to the center-to-center distance between the pivots 297, so that with a rocking of bellcranks 296, bar 293 is maintained in parallel relation to the front carriage rail 212. The depending end 300 of link 299 carries a pin 301 engaged in the bifurcated end of a laterally offset arm 302 of a lever 303 pivoted at 304 on transverse frame member 17. The depending arm of lever 303 is pivotally connected at 305 on the upturned end 306 of a forwardly extended arm of a bail 307 supported by arms 308 on a transverse shaft 309 and having one of the arms 308 secured on the shaft 309 for translation of the bail therewith. Shaft 309 is supported at its ends for reciprocatory movement in frame member 14 and auxiliary frame member 263 and is normally urged to the right, to the left as viewed in Fig. 6, by a weak spring 310 compressed between frame member 14 and the secured hub of one arm 308 of bail 307. Hence, when the shaft 309 is in its spring-urged position, bar 293 and the pins 294 thereon, are maintained below the ends of the tabulator keys 211 and parallel with the front carriage rail 212. As seen in Fig. 6, if any one of the "1" to "10" tabulator keys 211 is depressed, as for example, the "10" key, an attempted rightward translation of shaft 309 will be prevented by the engagement of the rightmost pin 294 on bar 293 with the end of the depressed key 211. However, if there were no keys depressed, shaft 309 may be moved to the left (right in Fig. 6) and bail 307 will impart a counter-clockwise rotation to lever 303, moving link 299 to the right (left in Fig. 6), thereby rocking bellcranks 296 clockwise to move bar 293 upwardly to a position adjacent the lower surface of rail 212 but not in engagement therewith.

The axial translation of shaft 309 to the left (to the right when viewed from the rear as in (Figs. 4 and 6) is under the control of a bellcrank 314 pivoted at 315 on a depending portion of bearing plate 192 and having a roller 316 on a laterally disposed arm thereof in engagement with cam 292. The semi-circular lower end of the depending arm of bellcrank 314 is in engagement with one arm 317 of a bail 318 resiliently slidable on shaft 309. A collar 319 is secured on shaft 309 and serves as a limit stop for the arm 317 of bail 318, to which position the bail is normally urged by a relatively strong spring 320 compressed between collar 319 and a bushing in arm 321 of bail 318. Collar 319 is so positioned on shaft 309 that spring 320 normally maintains roller 316 in engagement with cam 292. Thus, it can be seen that during each cyclic rotation of cam 292 bellcrank 314 is rocked, counter-clockwise in Fig. 4, to sense a depressed tabulator key 211 if the desired ordinal position of the carriage is to the left (to the right in Figs. 4 and 6) of the pin 217. If such is true, the depressed key prevents parallel upward movement of the pin bar 293 and hence axial translation of shaft 309 is prevented. In that event the compression of spring 320 enables idle rocking of bellcrank 314 and idle translation of bail 318. As shown in Fig. 6, the pin 217 is mounted on lever 218 which is pivoted at 386 on the crossbar 20, so that the operation of parallel linkage 293, 299 has no effect upon pin 217 and lever 218.

Normally, shaft 309 is latched against reciprocation so that in all machine operations other than a dividend entry operation, it is immaterial whether or not an inboard tabulator key 211 is depressed, each cyclic clockwise rotation of cam 292 shifting the bail 318 idly and compressing spring 320. To latch shaft 309 against movement, a tooth 324 (Figs. 4, 6 and 7) of a latch lever 325 is normally in engagement with the shoulder formed by the head of a pin 326 on auxiliary side frame 263. Lever 325 is pivotally mounted at 327 for rocking movement on a bar 328 connecting the respective right and left shift selector arms 329 and 330 which are rockably mounted on shaft 309. A pin 331 on bar 328 is engaged in a notch adjacent the hook end of lever 325 to guide the lever in its rocking movement and a spring 332, secured at one end on an ear on bar 328 and at its other end on an ear formed at right angles to the lever 325, urges the tooth 324 counter-clockwise (Fig. 7) for engagement with the head of pin 326, thereby normally restraining shaft 309 against reciprocatory movement. A pair of collars 333 is secured on shaft 309, one on either side of arm 330 of the integral shift selector unit, indicated generally at 334, to effect a lateral movement of the shift selector unit with the reciprocation of shaft 309 upon release of latch lever 325. In the normally latched position of shaft 309, arm 329 of the selector unit 334 is positioned behind the depending ear 159 of the right shift controller 153. Therefore, if movement of shaft 309 is blocked, a rocking movement of the selector unit 334 will effect an engagement of the right shift clutch. Conversely, if no one of the tabulator keys 211 positioned to the left (to the right in Fig. 6) of the pin 217 is depressed, the first cycle of rotation of cam 292, in a dividend entry operation, will translate shaft 309 and selector unit 334 to the left (to the right in this figure) following the release of the latch lever 325, thereby positioning arm 330 in front of the depending ear 158 of the left shift controller 152, spring 320 being sufficiently stronger than spring 310 to shift shaft 309 against the force of spring 310. Thereafter, a rocking movement of selector unit 334 will effect an engagement of the left shift clutch. The spacing of arm 329 from arm 330 of the selector unit is such that following the movement of the shaft 309, to the right in Fig. 6 and upon rocking movement of the selector unit 334 to engage the left shift clutch, arm 329 is positioned to the immediate right of the depending ear 159. Thus, in the full-cycle position of cam 292 following each cycle of operation the engagement of arm 329 with the edge of ear 159 prevents a return of the shaft 309 to its left-hand position under the urgency of spring 310.

It will be recalled that upon depression of dividend entry key 210, the nose 284 of lever 277 is moved rearwardly of the machine, or to the right, as viewed in Fig. 9, to its operative position overlying pin 285 on arm 286, thereby rocking the upper end of lever 288 rearwardly, clockwise as viewed from the right side of the machine, or from the left side of Fig. 9. With the clockwise rocking of lever 288, the lower offset end 290 overlying latch lever 325 releases the tooth 324 of the lever 325 from engagement with the head of pin 326. Upon release of the latch lever 325, shaft 309 and shift selector unit 334 may or may not be moved to the right (Figs. 4 and 6) with the rocking of bellcrank 314 by the cam 292 in the first 60° of the resetting cycle, as determined by the position of a depressed tabulator key 211 relative to pin 217.

As explained hereinbefore, the eccentrically operated clearing and shifting control mechanism 143 is of conventional construction and is normally effective in the second machine cycle to initiate operation of the carriage left shift mechanism. Inasmuch as the carriage shifting mechanism is under the control of auxiliary means during a dividend entry operation, means are provided to disable the operation of the eccentrically controlled mechanism 143. For this purpose, pin 285 (Fig. 9) extends laterally to engage in a notch in an arm 336 carried by a sleeve 337 rockably mounted on shaft 66, which sleeve 337 also carries a bellcrank 338, the horizontally disposed arm of which underlies the lower end of a slide 339 (Figs. 3, 4, 5 and 9) mounted for vertical movement on transverse frame 19. Normally slide 339 is urged to the raised position shown by a spring 346 for cooperation with the override pawl 97 when the carriage is in its leftmost position, as viewed from the front of the machine. A link 340 is pivotally connected at its rear end at 341 to the lower end of a depending arm of bellcrank 338 and, at its forward end, link 340 is pivotally connected to an upwardly extended arm 342 of a bail 343 rockably mounted on shaft 142. The free end of an intermediate arm 344 of bail 343 is formed at a right angle to underlie left shift pusher arm 123. Likewise, the rearwardly extended end of a third arm 345 of bail 343 is formed at a right angle to underlie the left shift pusher arm 137 controlled by the power-operated mechanism 143. Thus, it can be seen that whether the left carriage shift is initiated by a depression of a manual shift key or whether it is initiated by the power-operated means 143, as the carriage reaches its leftmost position the override pawl 97 moves slide 339 downwardly, rocking bellcrank 338 (counter-clockwise when viewed from the left, as in Fig. 3) to rock bail 343 clockwise, or counter-clockwise in Fig. 1, to release pusher arms 123 and 137 from operative engagement with pusher rod 125 and pin 136, respectively. Similarly, a rocking movement of the arm 286 (Fig. 9) will serve through pin 285 to rock arm 336, and therefore sleeve 337 and bellcrank 338, to disable the operation of the pusher arms 123 and 137.

The rearwardly extended nose 284 of lever 277 normally lies out of the path of the angularly disposed offset end of an arm 348 of a lever 349 pivoted at 172 on transverse frame 19 (Fig. 4). At its other end, lever 349 carries a roller 350 urged by spring 173 to follow cam 351 secured on the rearwardly extended end of actuator shaft 41, spring 173 being tensioned between a stud on shift unlocking plate 162 and an ear formed at right angles to the arm of lever 349. The end of the arm 348 of lever 349 is normally positioned above, and spaced sufficiently from, pin 285 to permit the rearward movement of the nose 284 to a position between the end of the arm 348 and the pin 285 upon depression of the dividend entry key 210. In 180° of the first machine cycle, subsequent to the rocking of bellcrank 314, cam 351 is effective to rock lever 349 which, through lever 277, imparts a clockwise rocking movement to arm 286 and bellcrank 338, as viewed in Fig. 9. Thus, the left shift control is disabled prior to the operation of the eccentrically controlled mechanism 143 in the second cycle.

The rocking movement of the arm 286 (Figs. 1, 6 and 9) by lever 348 also serves to effect an engagement of the right or left shift clutch in accordance with the position of the shaft 309 and shift selector unit 334 following the first cycle operation of bellcrank 314. A spring 352 normally urges shift selector unit 334 to its forward position, the counter-clockwise position seen in Fig. 1, where arm 329 is maintained in engagement with a pin 353 on the upper end of an arm 354 pivotally mounted on arm 286. Movement of arm 354 is resiliently controlled by a spring 355 secured at its one end on an ear on arm 286 and at its other end on an ear on arm 354. Thus it can be seen, that after 180° of the first machine cycle, that is, approximately 120° following the counter-clockwise rocking of lever 314 (Fig. 4), cam 351 and lever 349, through interponent 284 and pin 285, rocks arm 286. The rocking of arm 286 tensions spring 355 to impart movement to arm 354 and pin 353 thereby effecting a clockwise rocking movement of the shift selector unit 334 (Fig. 1). Even though the clutch controller 152 or 153 is moved rearwardly of the machine to effect engagement of the left or right shift clutches, respectively, in the first machine cycle, that is, in the resetting cycle, the appropriate clutch is not engaged until the beginning of the second cycle to move the carriage to the left or right as determined by a depressed tabulator key 211 and its position outboard or inboard of the machine.

As lever 277 is rocked clockwise (Fig. 9) by the lever 349 to effect an engagement of the right or left shift clutch, the tooth 279 is moved from engagement with ear 276 on slide 275. Since the spring 283 was tensioned in moving the lever 277 rearwardly, the ear 276 is immediately urged by the spring to a position above the tooth 279, preventing relatching until spring 282 restores the lever 277 to its normally inoperative position. In each succeeding cycle, lever 349 is ineffectively rocked by the cam 351. After the arm 286 has been rocked to effect an engagement of the right or left shift clutch, latching means becomes effective to retain the clutch in engagement during the tabulating operation. As seen in Figs. 3, 6 and 9, arm 286 has integrally formed therewith a bellcrank 358 and both arm 286 and bellcrank 358 are normally urged to the position shown in Fig. 3 by a spring 359 attached to a pin on bellcrank 358 and to a pin on a latch lever 360 pivotally mounted on a stub shaft 361 secured on side frame member 13. The clockwise movement of arms 286 and bellcrank 358 (Fig. 9), or counter-clockwise movement (Fig. 3), is utilized to condition the control for entering the dividend at the end of the shifting operation and for maintaining the shift engaged until the selected tabulated position is reached. To latch the bellcrank 358 and arm 286 in the shift engaging position, the lower horizontal arm of bellcrank 358 is provided with a laterally extending ear 362 (Figs. 3 and 9) adapted for engagement with a notch in the latch lever 360 under the urgency of a spring 363. Either the right or left shift clutch is thereafter maintained engaged until the carriage has reached the desired tabulated position.

The movement of bellcrank 358 also serves to condition means for engaging the plus-minus gears to enter the dividend at the end of the shift operation. For this purpose a pin 364 on an arm 365 pivoted on shaft 262 adjacent bellcrank 358 is maintained in engagement with the upper arm of bellcrank 358 by a spring 366. Arm 365 is pivotally connected to one end of a link 367, the other end of which is pivoted at 368 intermediate the ends of a depending arm 369 pivoted at 370 on a lateral extension of an actuating slide 371 mounted for vertical sliding movement on side frame 13 by pin-and-slot connections 372. As seen in Fig. 3, depending arm 369 carries at its lower end a roller 373 normally positioned forwardly (to the right in Fig. 3) of a camming surface 374 on the end of one arm 375 of a latch releasing bail 376 rockably mounted on shaft 262. The other arm 377 of bail 376 carries a roller 378 (Figs. 9, 10 and 12) operatively related to an inclined surface 379 of an upstanding arm 380 pivoted at 381 on side frame member 13. As the bellcrank 358 is moved to its latched position, the arms 365 and 369 are rocked rearwardly to move roller 373 to its operative position overlying the camming surface 374 of arm 375. Such rocking of arm 365 enables a hook member 382 pivoted at 383 on frame member 13 and urged by a spring 384 into engagement with pin 364, to latch over the pin. Thus, it can be seen that whenever the arm 369 is latched in its rearward position (clockwise from the position shown in Fig. 3), the subsequent downward movement of slide 371 causes roller 373 to rock arm 375 and therefore arm 377 downwardly, or counter-clockwise as viewed in Figs. 10 and 12. Thereupon roller 378 cams arm 380 forwardly (counter-clockwise in these figures) to enable the engagement of the plus-minus gears for entry of the dividend, as later described.

A tabulation control is provided for effecting the release of the latching bellcrank 360 (Figs. 3 and 9) from its engagement with bellcrank 358 to effect a disengagement of the operative shift clutch in any shifted position of the carriage as determined by a depressed tabulator key 211 and to enable the entry of the dividend in such position. In the event the dividend entry key is operated and no tabulator key 211 has been depressed, the carriage will be tabulated to its left end position followed by a registration of the dividend therein or, upon the inadvertent release of a depressed inboard tabulator key 211 during movement of the carriage to the right, the carriage will continue movement to its right end position wherein a registration of the dividend will be effected. To effect a disengagement of the operative shift clutch and entry of the dividend, the lower end of a depressed key 211 engages the pin 217 (Figs. 3 and 6) on lever 218 pivoted at 386 on transverse frame 20, camming the lever 218 downwardly as the carriage is shifted to the right or to the left into the desired tabulated position. A lateral extension 387 is formed at right angles on the right end of lever 218 and is disposed above the horizontally extended end 388 of actuating slide 371 for cooperation therewith. Actuating slide 371 and lever 218 are normally urged by a spring 389 to their inoperative, or raised, position, as determined by the engagement of the lateral extension 387 of lever 218 with the lower edge of transverse frame member 20. At its lower end, actuating slide 371 is provided with a rearwardly extended offset ear 390 which is operatively related to a roller 391 on the end of an arm 392 of bellcrank lever 360. Roller 391 is normally spaced from ear 390 sufficiently to permit the counter-clockwise movement of the bellcrank 360 for the engagement of the notch therein with the ear 362 of bellcrank 358. Thus, when the carriage shifts into its predetermined position, the actuating slide 371 is moved downwardly to impart a rocking movement to the bellcrank latch lever 360, thereby releasing bellcrank 358 to the urgency of the spring 359. It will be recalled that the bail, which includes the bellcrank lever 358 and arm 286, was latched in its effective, i.e., its shift controlling, position by the operation of the cam follower 349 in the first cycle of operation. It will also be recalled that the operation of the dividend entry key 210, by the rocking of two-arm lever 257 (Fig. 3), rocked the bail comprising the bellcrank 260, 264 and the arm 274, and the latching of the key stem of the dividend entry key in its depressed position holds this bail in its operative position until the key is released. It will be further recalled that the rocking of arm 274, through the medium of spring-operated latching slide 275 (Fig. 9) moved the arm 277 rearwardly, so that the interponent end 284 thereof was positioned under the end 349 of cam follower lever 348, and, in the latter part of the first operating cycle, the cam follower 349 was operated to rock arm 277 downwardly against the force of its spring 282, thereby rocking arm 286 rearwardly through the engagement of the interponent with the pin 285 carried by the arm 286. The bail which includes the arm 286 and the bellcrank latching lever 358 was thereupon locked in the adjusted position by the latching bellcrank 360. Further, it will be remembered that the rocking of the interponent arm 277 rocked its ear 279 away from the ear 276 on latching slide 275, so that the arm 277 was enabled to return to its normal, inoperative position by the force of its spring 282. Finally it will be recalled that the rocking of arm 286, through the force of spring 355, would strongly bias arm 354 to follow to its rearward, operative position as soon as the clear cycle was completed. Thereupon the pin 353, carried by arm 354, is effective to rock shift control arms 329, 330 rearwardly (clockwise in Fig. 1) to engage one or the other of the shift clutches. Thus, the release of bellcrank 358 by its latching lever 360, enables its spring 359 to immediately return the bail including the arms 286 and 354 and pin 353 to its normal, inoperative, position; whereupon the shift control unit 334, including the arms 329 and 330 is enabled to rock to its inoperative position by means of spring 352. In the machine with which this invention is associated, as well as all other calculating machines, there are conventional full-cycle locks with require that the current cycle be completed before the clutches can become disengaged. It is obvious, therefore, that the depression of the tabulation terminating slide 371 (Fig. 3), by the engagement of pin 217 with a depressed tabulator key 211, is effective through the means described to release shift control unit 334 to the influence of its spring 352 to terminate the shifting phase of the operation. At this time, however, the spring 366 is ineffective to rock arm 365 clockwise, since it is latched by the hook member 382, thereby preventing restoration of the roller 373 prematurely. The release of the latch 360 occurs toward the end of the last shift cycle, i.e., after approximately 300° of the cycle.

Substantially simultaneously with the release of the latch lever 360, the downward movement of actuating slide 371 also serves to release spring-actuated means for meshing the plus-minus gears and for releasing the dividend entry key 210. The downward movement of slide 371, after approximately 300° of the last shift cycle (Figs. 3, 10, 11 and 12), acts through interponent arm 369 and arm 375 to rock arm 377, counter-clockwise in Figs. 10 and 12, thereby camming a shoulder 393 of a notch in arm 380 out of latching engagement with a laterally extended ear 394 of a lever 395 pivoted at 396 on a stud extending outwardly from side frame member 13. The upper end of lever 395 is formed as a cam nose 401 for operative engagement with a roller 402 carried at the lower end of a lever 403 secured on a plus-minus gate shaft 66. As seen in Fig. 10, the cam nose 401 of lever 395 is spaced from roller 402 in the centralized position of shaft 66 to permit normal movement of the plus-minus gate 64 and lever 403 during registration of a negative sign character. The upper arm of lever 403 is disposed in front of, and in engagement with, an extension of pin 231 on lever 232, so that upon clockwise rocking movement of lever 403, latch slide 229 (Figs. 2 and 10) is moved to the right to release the dividend entry key 210 to the influence of its spring 223. With the rightward movement of latch slide 229, lever 232 is likewise rocked clockwise. A gooseneck arm 404 of lever 232 is pivotally connected at 405 to the upper end of a depending arm 406, the lower end of which is bifurcated (see Fig. 3) to engage pin 383 to guide arm 406 in its upward and downward movement. In the normal position of the parts, a gap exists between the lateral extension of the hook member 382 and the lower end of arm 406 sufficient to permit engagement of the hook with the pin 364, whereupon the lateral extension of hook member 382 moves into engagement with the end of arm 406. The downward movement of arm 406 is thereby effective to release the hook member 382 from its engagement with pin 364 upon clockwise rocking movement of lever 232 (Fig. 10). The arm 365 and interponent 369 are thereafter restored to their inoperative position under the urgency of spring 366.

Upon release of the shoulder 393 from beneath the ear 394 (Figs. 10, 11 and 12), lever 395 is urged counterclockwise by a relatively strong spring 400 in cooperation with a link 410. A pin 411 on a lateral projection of a lever 412 pivoted at 413 on side plate 12 provides a pivotal connection for the forward end of link 410 and supports the forward end of spring 400, the rearward end of which is supported on a stud on the side frame. Adjacent its rearward end, link 410 has an upwardly extended portion 414 pivotally mounted at 415 to the lower end of lever 395. The rearward extremity of link 410 abuts one arm of a switch control lever 416 pivoted at 417 for counter-clockwise movement in a horizontal plane on a long stud 418 vertically disposed on the base of the machine. The other arm of lever 416 extends inwardly through a rectangular aperture in side frame 13 and is formed to embrace the downwardly disposed end of link 56 (Fig. 3) which controls the closing of the motor switch. Lever 412 is provided at its free end with a roller 419 for cooperation with a cam 420 pinned in spaced-apart relation on a disk 421 secured on main drive shaft 42 for rotation therewith, clockwise as seen in Fig. 10.

With the release of the latch 380 in approximately 300° of the last shift cycle, roller 419 is moved into engagement with the periphery of the cam 420, thereby holding lever 395 in the inoperative position shown in Fig. 10 for approximately another 30° rotation of the cam 420. As the cam 420 is rotated into the full-cycle position thereof shown in Fig. 10 during the last shift cycle, spring 400 becomes effective to rock arm 412 clockwise, and, through link 410, to rock lever 395 counter-clockwise to the position determined by the engagement of the left end of an arcual slot 422 with the end of shaft 262.

Roller 419 is thereby positioned for immediate engagement by the clockwise end of cam 420 at the beginning of the ensuing cycle to restore lever 395 to its latched position. Upon movement of lever 395 by spring 400, cam nose 401 becomes effective to rock lever 403 and shaft 66 in a clockwise direction, thereby meshing plus gears 62 with the numeral wheel gears 32 (Fig. 1) to determine a positive registration of a keyboard value in the dials 30 during the ensuing, or dividend entering, cycle.

Movement of lever 403 also serves to actuate latch slide 229 (Fig. 10) and thereby release the dividend entry key 210. It will be recalled that the depression of the dividend entry key serves to hold counter blocking slide 269 (Fig. 3) in its active position during the shifting phase of the operation. Inasmuch as the dividend entry key is released near the end of the last shift cycle, means must be brought into play to prevent movement of the counter blocking slide 269 out of active position during the dividend entry phase of the operation. For this purpose, the offset ear 394 (Figs. 10 and 11) of lever 395 moves downwardly in front of an offset ear 423 on lever 266 to maintain lever 266 in its clockwise rocked position against the urgency of spring 271. Also with the release of the dividend entry key near the end of the last shift cycle, the main clutch 45 would normally be disengaged and the motor switch opened. However, with the clockwise rocking of lever 412, the rearward end of link 410 rocks lever 416 (counter-clockwise as viewed from the top) to retain clutch 45 engaged and the motor switch closed.

As the cam 420 rocks lever 412 counter-clockwise in the first part of the dividend entry cycle, the roller 419 moves on to the high portion 424 of cam 420, thereby rocking the ear 394 of lever 395 clockwise beyond its latching position with respect to the shoulder 393 of latch arm 380. As the cam 420 continues its clockwise rotation during this last machine cycle, the lever 395 again becomes latched by the arm 380, as seen in Fig. 10. Even though lever 412 is immediately restored to its inoperative position, thereby enabling the return of the switch control link 56 to its inoperative position under the urgency of spring 57 (Fig. 2), the cyclic clutch 45 will remain in engagement until it has reached its full-cycle position wherein the operation will be terminated. Likewise, with the relatching of the lever 395, a full-cycle lock operates in a conventional manner to retain the plus gears 62 in engagement with the numeral wheel gears 32 until the end of the cycle.

As described hereinbefore, in the normally inoperative position of the arm 274 and lever 277, as seen in Fig. 9, there is a gap between the ear 276 on slide 275 and the tooth 279. Upon clockwise rocking of the lever 277 to initiate operation of the shifting mechanism, the tooth 279 is released from engagement with the ear 276 and the arm 278 and lever 277 is restored by spring 282 to its inoperative position. The tensioned spring 283 also moves the ear 276 beyond the tooth. With the restoration of the lever 395 to its latched position counter blockout spring 271 (Fig. 3) serves through lever 266 and bellcrank 261 to restore arm 274, counter-clockwise in Fig. 9, whereupon ear 276 will cam lever 277 clockwise sufficiently to permit the ear to move over the tooth 279 into the operative position relative thereto. Although the spring 271 restores the lever 266 to its normal position in the early part of the dividend entry cycle, the tooth 270 on counter blockout slide 271 (Fig. 3) is not moved from its blocking position relative to ear 75 until after the rocking phase of the counter actuator operation.

As explained supra, the carriage 21 may be moved to its extreme left or right position, as viewed from the front of the machine, wherein respective override pawls 97 and 98 (Fig. 4) control the entry of the dividend therein. Referring now to Figs. 2, 3 and 4, control slide 339, slidably mounted on rear transverse frame 19 and normally urged by spring 346 to the position shown in Fig. 3, is provided with an ear 428 overlying an ear 429 formed at right angles to a lever 430 pivoted at 233 (Fig. 2) on side frame member 13. A link 431 is pivoted at its upper end at 434 on lever 430 and at its lower end at 435 on the end of one arm of a bellcrank 436 pivoted at 437 on side frame 13. The other arm of bellcrank 436 is provided at its end with a slot engaging a pin 438 on the end of a U-shaped arm 439 of a bellcrank 440 pivoted at 441 on right side frame member 13. An angularly disposed arm 442 of bellcrank 440 is provided with a pin 443 overlying a lateral projection 444 on the lower end of shift terminating slide 371. Thus, it can be seen that as the carriage moves into its leftmost position, the end 445 of override pawl 97 (Fig. 4) moves slide 339 downwardly to rock lever 430 clockwise, thereby imparting a clockwise rotation (in Fig. 2) to bellcrank 436 through link 431 and a counter-clockwise rotation to bellcrank 440 and thus move the slide 371 downwardly to terminate the left shift operation and to initiate operation of the dividend entry mechanism as previously described.

A dividend entry is effected in the register with the carriage in its rightmost end position under the control of the override pawl 98 (Fig. 4). A bellcrank 450 is pivoted at 451 on bearing plate 192 and carries at its upper end a roller 452 for engagement by the nose 453 of override pawl 98 when rocked clockwise with the carriage in its right end position. A pin 454 on a depending arm of bellcrank 450 pivotally supports one end of a link 455, the other end of which is pivotally connected at 456 to a depending arm of a bellcrank 457 pivotally mounted on the shift control bearing plate 96. The horizontal arm of bellcrank 457 is provided at its end with a formed-over ear 458 (Figs. 2, 3 and 4) which overlies the ear 429 of lever 430 in a position adjacent that of ear 428 on the slide 339 and is normally spring-urged to the position shown. Thus, it can be seen that with the carriage in its right end position, the clockwise rocking movement of override pawl 98 will impart a counter-clockwise rotation (in Fig. 4) to bellcranks 450 and 457 through link 455 to rock lever 430 clockwise (in Fig. 2), thereby initiating the dividend entry operation, as described in connection with the control by the override pawl 97.

Means are provided for preventing the relatching of lever 395 by latch arm 380 when the latch 380 is released by the operation of either override pawl 97 or 98 when there are no tabulator keys 211 depressed. Either override pawl 97 or 98 releases latch arm 380 and hook member 382 in approximately 100° of the override cycle, however, lever 395 is not rocked counter-clockwise (Fig. 10) by spring 400 because of the engagement of the roller 419 with the periphery of cam 420. Since there is no tabulator key 211 maintaining slide 371 depressed, it will restore immediately to its raised position, thereby enabling latch 380 to attempt a re-engagement with the ear 394 of lever 395 prior to the release of the lever 395 to spring 400 near the end of the machine cycle. As seen in Figs. 10, 11 and 12, latch arm 380 is provided with a live point 462 mounted for reciprocatory movement thereon by the engagement of an elongated slot 463 adjacent the upper end and an open end slot in the lower end thereof with respective pins 464 and 465. The lower end of slot 463 limits the raised position to which pawl 462 is urged by a spring 466 secured at its ends in the offset portions of the arm 380 and the pawl 462. In the normally latched position of the lever 395, the ear 394 rests on shoulder 393 of arm 380 and by its engagement with a nose 467 of pawl 462, retains the pawl in its lowered position against the urgency of the spring 466. However, upon release of the latch 380 from its engagement with the ear 394, spring 466 urges pawl 462 upwardly to the position shown in Fig. 12. Since the latch arm 380 is permitted to return to its latching position under the urgency of its spring before lever 395 is released to condition the plus-minus gears for the dividend entry operation in the ensuing cycle, the nose 467 abuts the ear 394 of lever 395, thereby preventing notch 393 from a re-engagement with the ear 394. To relatch lever 395 by the latch arm 380 in approximately the first 90° of the ensuing, or dividend entry, cycle, the high point 424 of the cam 420 is sufficient to rock lever 395 clockwise beyond its normal position so that the nose 467 of the raised pawl 462 will move beneath the ear 394.

If the carriage 21 is standing in the desired position, that is, the depressed tabulator key 211 is positioned over the pin 217 when the dividend entry key 210 is depressed, the slide 371 and arm 369 (Fig. 3) will be in their downward position to hold latch lever 360 in its inoperative position with respect to bellcrank 358. As the key 210 is depressed, lever 257 rocks bellcrank 261 and therefore arms 274 and 278, clockwise as viewed in Fig. 9, to move the nose 284 to the rear to overlie pin 285 and to underlie the end of the arm 348 of lever 349 (Fig. 4). Thus, after approximately 180° of the first machine cycle, cam 351 rocks lever 349 to rock arms 286 and 354, clockwise in Fig. 9 momentarily. Thereupon the upstanding arm of bellcrank 358, by its engagement with pin 364 (Fig. 3), rocks arms 365 and 369 counter-clockwise and clockwise, respectively, to move the roller 373 on arm 369 over the cam surface 374 of arm 375, thereby releasing the latch arm 380 from its engagement with the ear 394 of lever 395. Lever 395 is maintained in its inoperative position, however, until near the end of the second 180° rotation of the cam 420. Since latching bellcrank 360 is maintained in its inoperative position by slide 371, the arms 286 and 354 and the mechanisms controlled thereby, are immediately restored to their ineffective position under the urgency of the springs 352 and 359. Upon release of the lever 395 near the end of the first machine cycle, the plus-minus gate is conditioned for entry of the dividend, hook member 382 is released from pin 364, and the dividend entry key 210 is released. The dividend entry is effected in the next machine cycle and the lever 395 is restored to its latched position, as described supra.

As explained before, if a dividend entry operation is in progress and it is desired to terminate the operation by the manual control 235, the clockwise rocking movement of the lever 235 (Fig. 10) immediately rocks lever 243 clockwise through lever 240 and, through the engagement of the upstanding arm of lever 243 with the pin 231, moves key latch slide 229 to the right, thereby releasing the dividend entry key 210 to terminate the operation. It will be recalled, however, that with the depression of the dividend entry key 210 to initiate the operation, latch lever 360 (Fig. 3) became effective to retain the engaged shift clutch in engagement. With the engagement of the notch in latch lever 360 with the ear 362 on bellcrank 358, a pin 468 on a horizontal arm of lever 360 is moved to the lower end of a slot 469 in the lower end of a link 470 pivoted to one end of a lever 471 mounted at 472 for rocking movement on side frame 13. At its other end lever 471 has a pivotal connection with a link 473, also pivoted on pin 405 between levers 404 and 406. Thus, it can be seen, that upon rearward movement of manual control lever 235 to terminate the dividend entry operation, the clockwise rocking of lever 232 moves arm 406 (Fig. 3) downwardly to release latch 382, and, through link 473, lever 471, and link 470, rocks latch lever 360 clockwise to release the shift control mechanism to the influence of springs 352 and 359 and the operation is terminated with all parts returned to their normally inoperative position.

In the modification shown in Fig. 13, means may be provided to enable multicyclic operation of the dividend entry mechanism. Alternatively, the lever 476 may be substituted for lever 277 (Fig. 9), in which case lever 476 is pivotally mounted at 477 on an arm 478 integral with the bellcrank 261 rockable on the shaft 262. A pin 479 is provided on lever 476 to control the release of the shift control latch slide 325 in a manner similar to that described above in connection with lever 277. A spring 480 normally urges lever 476, arm 478, and integral bellcrank 261 to the inoperative position thereof. If the dividend entry key 210 is depressed, the carriage is first tabulated to the desired position as determined by the depressed tabulator key 211 and multiple registrations of the value set in the keyboard will be effected in the accumulator as determined by the number of machine cycles for which the key 210 is maintained depressed.

We claim:

1. In a calculating machine having a keyboard, an ordinally shiftable carriage, an ordinal register in said carriage having some orders lying inboard of said keyboard and other orders lying outboard thereof, means for shifting said carriage relative to said keyboard in either direction, a right shift clutch and a left shift clutch selectively operable to control the operation of said shifting means, and a cyclically operable means for driving said shifting means upon engagement of either of said clutches, the combination which comprises normally inoperative means operable to initiate operation of said shifting means and adjustable from a normal right shift clutch operating position to a left shift clutch operating position, a plurality of selectively settable members each corresponding to an ordinal position of said carriage, means actuated by said cyclically operable means to resiliently adjust said adjustable means, means rendered operable by a set one of said members corresponding to an inboard order of said register to disable the operation of said actuated means, means driven by said cyclically operable means in timed relation to the operation of said actuated means for rendering said adjustable means effective to engage one of said clutches in accordance with the adjustment of said adjustable means, and means controlled by a selected one of said members in set position to render said driven means ineffective upon movement of said carriage in either direction into the ordinal position corresponding to the set member.

2. In a calculating machine having a keyboard, an ordinally shiftable carriage, an ordinal register in said carriage, means for shifting said carriage in either direction toward a selected ordinal position thereof relative to said keyboard, means operable in the selected ordinal position of said carriage to terminate the operation of said shifting means, a cyclically operable actuating means for said shifting means, a manually operable control means for initiating operation of said actuating means, and a plurality of selectively settable members each corresponding to an ordinal position of said carriage and each effective in set position to control the operation of said terminating means upon movement of said carriage into the position corresponding thereto, the combination which comprises positionable means normally operable upon operation of said control means to control the operation of said shifting means to shift said carriage to the right and adjustable to a position to control the operation of said shifting means to shift said carriage to the left, means driven by said actuating means operable to resiliently adjust said positionable means to enable operation of said shifting means to move said carriage to the left into an ordinal position corresponding to a set one of said members, and means rendered effective by a set one of said members corresponding to an ordinal position of the carriage to the left of the ordinal position of said terminating means to disable the operation of said driven means thereby enable the operation of said shifting means to move said carriage to the right into the ordinal position corresponding to the set member.

3. In a calculating machine having a selection mechanism, an ordinally shiftable carriage, a register in said carriage, differential actuator means for transmitting a value from said selection mechanism into said register, a cyclic drive means for said actuator means, means for zeroizing said register in any ordinal position of said carriage, a manually operable means for initiating operation of said cyclic drive means and said zeroizing means, means for shifting said carriage in either direction relative to said selection mechanism, means operable to terminate the operation of said shifting means in a selective one of a plurality of ordinal positions of said carriage and to enable the operation of said actuator means, and a plurality of selectively settable tabulator keys each corresponding to an ordinal position of said carriage and each effective in set position to control the operation of said terminating means upon movement of said carriage into the position corresponding thereto, means for controlling the direction of shifting movement of said carriage comprising the combination of a shift control means for said shifting means positionable from a normal right shift control position to a left shift control position, means for latching said shift control means in the normal position thereof, means for releasing said latching means, a first cam operated means driven by said cyclic drive means, a resilient means controlled by said first cam operated means to position said shift control means in a left shift position upon release of said latching means when the ordinal position of said carriage corresponding to a set one of said keys is to the right of said terminating means, a sensing means operable to prevent operation of said resilient means when the ordinal position of said carriage corresponding to a set one of said keys is to the left of said terminating means, a second cam operated means driven by said cyclic drive means, rockable means for controlling the operation of said shift control means to initiate the operation of said shifting means in accordance with the position of said shift control means, a normally ineffective means movable by said manually operable means to an active position to effect operation of said latch releasing means and operable in the active position thereof to effect a rocking movement of said rockable means by said second cam operated means, and a latch means effective to maintain said rockable means in the rocked position until release by said terminating means.

4. In a calculating machine having a selection mechanism, an ordinally shiftable carriage, a register in said carriage, differential actuator means for transmitting a value from said selection mechanism into said register, a cyclic drive means for said actuator means, means for zeroizing said register in any ordinal position of said carriage, a manually operable means for initiating operation of said cyclic drive means and said zeroizing means, means for shifting said carriage in either direction relative to said selection mechanism, means operable to terminate the operation of said shifting means in a selective one of a plurality of ordinal positions of said carriage and to enable the operation of said actuator means, and a plurality of selectively settable tabulator keys each corresponding to an ordinal position of said carriage and each effective in set position to control the operation of said terminating means upon movement of said carriage into the position corresponding thereto, means for controlling the direction of shifting movement of said carriage comprising the combination of an adjustable shift control means for said shifting means normally urged to a right shift control position, a first cam operated means driven by said cyclic drive means operable to adjust said shift control means to a left shift control position whenever one of said keys corresponding to an ordinal position of said carriage to the right of said terminating means is in set position, a sensing means operable to prevent adjustment of said shift control means by said first cam operated means whenever the ordinal position of said carriage corresponding to a set one of said keys is to the left of said terminating means, a second cam operated means normally ineffectively driven by said cyclic drive means in timed relation to said first cam operated means, means rendered operable by said second cam operated means upon effective operation thereof to control the operation of said shift control means to initiate the operation of said shifting means in accordance with the adjustment of said shift control means, and means positionable by said manually operable means to render said second cam operated means effective upon operation of said cyclic drive means.

5. In a calculating machine, having an ordinally shiftable carriage, means for shifting said carriage, a right shift clutch and a left shift clutch selectively operable to control the operation of said shifting means, and a cyclically operable drive means for driving said shifting means upon engagement of either of said clutches, the combination which comprises an adjustable member for selectively controlling the engagement of either of said shift clutches, a spring means normally operative to urge said adjustable member to a position for controlling the engagement of the said right shift clutch, means rockably to effect operation of said adjustable member, a latch means for latching said rockable means in rocked position, a shift terminating means operable to release said latch means, a plurality of selectively settable tabulator keys in said carriage each corresponding to an ordinal position of said carriage and each operable in set position to effect operation of said terminating means upon movement of said carriage into the position corresponding thereto, a first cam and a second cam driven by said cyclically operable drive means, a resilient means operable to adjust said adjustable member to a position for controlling engagement of said left shift clutch, a lever operable by said first cam to effect operation of said resilient means, a sensing means operable to be moved by said resilient means to effect adjustment of said adjustable means when a selectively set key corresponds to an ordinal position to the right of said terminating means and operable to be blocked against movement by a selectively set one of said keys corresponding to an ordinal position to the left of said terminating means thereby causing said resilient means to yield upon operation of said first cam operated lever, a normally ineffective means actuated by said second cam in timed relation to the operation of said first cam operated lever for controlling the rocking movement of said rockable means, a manually operable control means for initiating operation of said cyclically operable drive means, and means movable by said manually operable control means into position to render said actuated means effective to rock said rockable means thereby enabling said latch means and effecting operation of said shifting means.

6. In a calculating machine having a keyboard, an ordinally shiftable carriage, an ordinal register in said carriage having some orders lying inboard of said keyboard and others lying outboard thereof, means for ordinally shifting said carriage in either direction relative to said keyboard to an end position of the carriage, an actuating means for effecting the transmission of a value from said keyboard into selected inboard orders of said register, a cyclically operable drive means for said actuating means, means for terminating operation of said shifting means and enabling operation of said actuating means, means actuated by said shifting means in either end position of said carriage to control operation of said terminating means, and a plurality of selectively settable members each corresponding to an ordinal position of said carriage and each effective in set position to control the operation of said terminating means upon movement of said carriage into the position corresponding thereto, the combination which comprises an adjustable means normally positioned for control of said shifting means to move said carriage to the right, a latch means for latching said adjustable means in its normal position, a normally effectively resilient means operable by said drive means to adjust said adjustable means into position for control of said shifting means to move said carriage to the left, sensing means rendered operable by a set one of said members corresponding to an inboard order of said register to prevent operation of said resilient means to adjust said adjustable means, a manually operable control means for initiating operation of said drive means, means for operating said adjustable means to initiate operation of said shifting means in accordance with the adjustment of said adjustable means, means normally ineffectively driven by said drive means for enabling the operation of said operating means, means positionable by said manually operable means to release said latch means and render said driven means effective, and means operable upon operation of said terminating means to restore said adjustable means to its normally latched position upon displacement therefrom.

7. In a calculating machine having a selection mechanism, an ordinally shiftable carriage, an ordinally arranged register in said carriage having some orders lying inboard of said selection mechanism and other orders lying outboard thereof, differential actuator means for transmitting a value from said selection mechanism into said register, a cyclic drive means for said actuator means, means for shifting said carriage in either direction to an end position, a power-operated means driven by said cyclic drive means operable to initiate operation of said shifting means and positionable to control the direction of the shifting operation, a manually operable means for initiating operation of said cyclic drive means, means operable to terminate the operation of said shifting means and to enable the operation of said actuator means, and a plurality of selectively settable tabulator keys each corresponding to an ordinal position of said carriage and each effective in set position to control the operation of said terminating means upon movement of said carriage into the position corresponding thereto, means for positioning said power-operated means for initiating operation of said shifting means to shift said carriage directly to a forward position determined by a set key comprising means resiliently biasing said power-operated means to its right shift position, means controlled by said manually operable means and operated by said cyclic drive means to resiliently move said power-operated means to its left shift position, a sensing means for sensing a set tabulator key corresponding to an order of said register inboard of said selection mechanism and operative when so sensing a set tabulator key to block movement of said power-operated means to its left shift position, and means thereafter operable to enable said cyclic drive means to operate said power-operated means to initiate a shifting operation.

References Cited in the file of this patent

UNITED STATES PATENTS

| | | |
|---|---|---|
| 2,216,636 | Webb | Oct. 1, 1940 |
| 2,252,621 | Eichler | Aug. 12, 1941 |
| 2,352,376 | Friden | June 27, 1944 |
| 2,365,324 | Avery | Dec. 19, 1944 |
| 2,603,417 | Pinckney | July 15, 1952 |
| 2,653,763 | Hopkins | Sept. 29, 1953 |

OTHER REFERENCES

Ser. No. 288,057, Eichler (A.P.C.), published May 25, 1943.

UNITED STATES PATENT OFFICE
CERTIFICATE OF CORRECTION

Patent No. 2,926,846                                      March 1, 1960

Arthur J. Malavazos et al.

It is hereby certified that error appears in the printed specification of the above numbered patent requiring correction and that the said Letters Patent should read as corrected below.

Column 1, line 61, after "being" insert -- taken --; column 4, line 65, for "and" read -- or --; column 7, line 53, after "201" insert a comma; column 13, line 50, after "353" insert a comma; column 17, line 59, after "position" insert a comma; column 19, line 24, after "Fig. 9" insert a comma; column 22, line 10, after "machine" strike out the comma; line 21, for "rockably" read -- rockable --; column 23, line 14, after "and" insert -- to --; column 24, line 7, for "to a forward" read -- toward a --.

Signed and sealed this 27th day of September 1960.

(SEAL)
Attest:

KARL H. AXLINE                                    ROBERT C. WATSON
Attesting Officer                                Commissioner of Patents